United States Patent
Isono et al.

(10) Patent No.: US 8,733,848 B2
(45) Date of Patent: May 27, 2014

(54) VEHICLE BRAKE DEVICE AND ITS RESERVOIR

(75) Inventors: Hiroshi Isono, Mishima (JP); Yasuji Mizutani, Brussels (BE)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 875 days.

(21) Appl. No.: 12/302,970

(22) PCT Filed: May 31, 2007

(86) PCT No.: PCT/JP2007/061498
§ 371 (c)(1),
(2), (4) Date: Dec. 1, 2008

(87) PCT Pub. No.: WO2007/139235
PCT Pub. Date: Dec. 6, 2007

(65) Prior Publication Data
US 2009/0152941 A1    Jun. 18, 2009

(30) Foreign Application Priority Data

May 31, 2006    (JP) .................................. 2006-152529
Jul. 7, 2006    (JP) .................................. 2006-187703

(51) Int. Cl.
*B60T 8/48*    (2006.01)

(52) U.S. Cl.
USPC .... 303/114.1; 303/87; 303/113.2; 303/113.4; 303/115.1; 303/115.4; 303/116.1; 303/116.2; 188/181 A; 188/195; 188/349; 188/358; 701/70

(58) Field of Classification Search
USPC .................................. 303/114.1, 115.1, 113.2
IPC ........................................................ B60T 8/48
See application file for complete search history.

(56) References Cited

U.S. PATENT DOCUMENTS

| | | | |
|---|---|---|---|
| 5,484,352 A | | 1/1996 | Kuma |
| 5,584,539 A | * | 12/1996 | Hashida ..................... 303/113.2 |
| 5,947,566 A | * | 9/1999 | Tobisawa et al. ........... 303/114.1 |
| 6,142,581 A | * | 11/2000 | Yamaguchi et al. ........ 303/113.2 |
| 6,312,062 B1 | * | 11/2001 | Hashida ..................... 303/113.2 |

(Continued)

FOREIGN PATENT DOCUMENTS

| | | | | |
|---|---|---|---|---|
| DE | 195 27 805 | | 3/1996 | |
| EP | 606840 A1 | * | 7/1994 | ............... B60T 8/48 |

(Continued)

OTHER PUBLICATIONS

Chinese Office Action dated Apr. 13, 2012, issued in Chinese Patent Application 200780020380.3 (with English translation).

*Primary Examiner* — Robert A Siconolfi
*Assistant Examiner* — San Aung
(74) *Attorney, Agent, or Firm* — Oblon, Spivak, McClelland, Maier & Neustadt, L.L.P.

(57) ABSTRACT

A vehicular braking apparatus including a shut-off valve for shutting off, as needed, a flow of oil from a wheel cylinder to a master cylinder; a pressure increase-decrease control valve increasing and decreasing a pressure in the wheel cylinder; a reservoir receiving and storing in a reservoir chamber the oil from the wheel cylinder when the pressure increase-decrease control valve is in a pressure decrease position; a pump sucking in and pressuring the oil from the reservoir chamber and supplying the oil to the wheel cylinder via the pressure increase-decrease control valve when the pressure increase-decrease control valve is in a pressure increase position; and a communication control valve controlling communication between the master cylinder and the reservoir chamber. The communication control valve is a normally-closed valve and is opened by a suction pressure of the pump.

12 Claims, 11 Drawing Sheets

(56) References Cited

U.S. PATENT DOCUMENTS

| | | | |
|---|---|---|---|
| 2002/0101114 A1* | 8/2002 | Kamiya et al. | 303/114.1 |
| 2006/0091725 A1* | 5/2006 | Ariki et al. | 303/115.4 |

FOREIGN PATENT DOCUMENTS

| | | | |
|---|---|---|---|
| EP | 0 706 923 A2 | 4/1996 | |
| EP | 0 706 923 A3 | 4/1996 | |
| GB | 2239913 A * | 7/1991 | B60T 8/48 |
| JP | 63 78861 | 4/1988 | |
| JP | 5 116607 | 5/1993 | |
| JP | 8 310369 | 11/1996 | |
| JP | 10 157598 | 6/1998 | |
| JP | 10 264801 | 10/1998 | |

* cited by examiner

VEHICLE BRAKE DEVICE AND ITS RESERVOIR

TECHNICAL FIELD

The present invention relates to a vehicular braking apparatus, and more particularly, to a vehicular braking apparatus which increases and decreases the pressure in a wheel cylinder, as well as to a reservoir of the same.

BACKGROUND ART

A known vehicular braking apparatus for use in an automobile or the like is disclosed in, for example, Japanese Patent Application Laid-Open (kokai) Nos. 5-116607 and 10-264801 and has a shut-off valve for shutting off, as needed, a flow of oil, which serves as a working liquid, from a wheel cylinder to a master cylinder; a pressure increase-decrease control valve for increasing and decreasing the pressure in the wheel cylinder; a reservoir for receiving and storing oil from the wheel cylinder in a reservoir chamber when the pressure increase-decrease control valve is in a pressure decrease position; a pump, which serves as pressurizing supply means, for sucking in and pressurizing oil from the reservoir chamber and supplying oil to the wheel cylinder via the pressure increase-decrease control valve when the pressure increase-decrease control valve is in a pressure increase position; and a communication control valve for controlling communication between the master cylinder and the reservoir chamber.

In a braking apparatus of this type, in an ordinary braking mode, the pressure in the master cylinder is introduced into the wheel cylinder via the shut-off valve, thereby increasing and decreasing the pressure in the wheel cylinder by means of the pressure in the master cylinder. In a braking mode in which the pressure in the wheel cylinder must be made higher than the pressure in the master cylinder, the shut-off valve shuts off a flow of oil from the wheel cylinder to the master cylinder, and the pump is driven. High-pressure oil supplied from the pump is supplied to or drained from the wheel cylinder by means of the pressure increase-decrease control valve, thereby controlling the pressure in the wheel cylinder to a desired level.

According to a braking apparatus of this type, the communication control valve automatically opens and closes according to the pressure in the master cylinder and the suction pressure of the pump, thereby functioning as a pressure regulating valve for automatically regulating the pressure in the reservoir chamber according to the pressure in the master cylinder and the suction pressure of the pump. Therefore, as compared with the case where the communication valve is a solenoid valve, and also the solenoid valve is controlled on the basis of the results of detection by various sensors, the cost of the braking apparatus can be lowered, and control of the braking apparatus can be simplified through reduction of elements-to-be-controlled of the braking apparatus.

In the conventional braking apparatus as disclosed in the above-mentioned publications, the communication control valve is a normally-opened check valve. At the time of nonbraking when a driver does not perform a braking operation, in the check valve, a valve element is moved away from a valve seat. Therefore, at the time of nonbraking, the master cylinder and the reservoir chamber communicate with each other. When the driver begins a braking operation with a resultant increase in the pressure in the master cylinder, a flow of oil caused by a differential pressure between the pressure in the master cylinder and the pressure in the reservoir chamber causes the valve element of the check valve to be seated on the valve seat. Thus, the check valve closes, thereby shutting off communication between the master cylinder and the reservoir chamber.

However, since the check valve which serves as the communication control valve is a normally-opened check valve, even when the driver begins a braking operation, the check valve does not close until the amount of oil in the reservoir chamber increases so that the reservoir piston moves to a position of allowing the check valve to close and until a differential pressure between the pressure in the master cylinder and the pressure in the reservoir chamber attains a predetermined value. Accordingly, a portion of oil in the master cylinder unavoidably flows into the reservoir chamber via the check valve. Therefore, as compared with the case where all of oil flowing out from the master cylinder is supplied to the wheel cylinder via the shut-off valve, pressure rise in the wheel cylinder is delayed. This unavoidably raises a problem of deterioration in feeling which is caused by delay in pressure rise in the wheel cylinder and delay in actual braking action when the braking operation is performed. There is room for improvement in terms of enhancement of braking response at the time of beginning of the braking operation by the driver.

In the braking apparatus disclosed in the above-mentioned Japanese Patent Application Laid-Open (kokai) No. 10-264801, a pin (24) which butts against a ball (23b) of a check valve (23) is displaceable in relation to a piston (16b) of a reservoir in the opening/closing direction of the check valve. However, the check valve (23) is a normally-opened valve, and the pin (24) is not displaced in relation to the piston (16b) except for the case of manual movement for maintenance; i.e., the pin (24) does not automatically move in relation to piston (16b) in the valve-opening direction according to the suction pressure of a pump. Therefore, the braking apparatus disclosed in the above-mentioned Japanese Patent Application Laid-Open (kokai) No. 10-264801 also involves the above-mentioned drawbacks.

DISCLOSURE OF THE INVENTION

The present invention has been accomplished in view of the above-mentioned problems in the conventional vehicular braking apparatus in which a communication control valve for controlling communication between a master cylinder and a reservoir chamber is a normally-opened check valve, and a primary object of the invention is to prevent delay in pressure rise in a wheel cylinder at the time of beginning of a braking operation by a driver by means of the communication control valve shutting off communication between the master cylinder and the reservoir chamber at the time of nonbraking when the driver does not perform the braking operation, while the communication control valve retains a function of regulating the pressure in the reservoir chamber by automatically opening and closing according to the pressure in the master cylinder and the suction pressure of pressurizing supply means, thereby eliminating deterioration in feeling, which would otherwise be caused by delay in pressure rise in the wheel cylinder and delay in actual braking action when the braking operation is performed, and enhancing braking response at the time of beginning of the braking operation.

To achieve the above primary object, the present invention provides a vehicular braking apparatus having a shut-off valve for shutting off, as needed, a flow of a working liquid from a wheel cylinder to a master cylinder, a pressure increase-decrease control valve for increasing and decreasing a pressure in the wheel cylinder, a reservoir for receiving and storing in a reservoir chamber the working liquid from the wheel cylinder when the pressure increase-decrease control valve is in a pressure decrease position, pressurizing supply means for sucking in and pressurizing the working liquid from the reservoir chamber and supplying the working liquid to the wheel cylinder via the pressure increase-decrease control valve when the pressure increase-decrease control valve is in a pressure increase position, and a communication control valve for controlling communication between the master cylinder and the reservoir chamber, the vehicular braking apparatus being characterized in that the communication control valve is a normally-closed valve and is opened by means of a suction pressure of the pressurizing supply means.

To achieve the above primary object, the present invention further provides a reservoir provided in a vehicular braking apparatus having a shut-off valve for shutting off, as needed, a flow of a working liquid from a wheel cylinder to a master cylinder, a pressure increase-decrease control valve for increasing and decreasing a pressure in the wheel cylinder, and pressurizing supply means for pressurizing the working liquid and supplying the working liquid to the wheel cylinder via the pressure increase-decrease control valve when the pressure increase-decrease control valve is in a pressure increase position, the reservoir receiving and storing in a reservoir chamber the working liquid from the wheel cylinder when the pressure increase-decrease control valve is in a pressure decrease position, the reservoir chamber communicating with a suction side of the pressurizing supply means, the reservoir being characterized by comprising a communication control valve for controlling communication between the master cylinder and the reservoir chamber, the communication control valve being a normally-closed valve and being opened by means of a suction pressure of the pressurizing supply means.

According to the above configurations, the communication control valve is a normally-closed valve. Therefore, as compared with the conventional braking apparatus, in which the communication control valve is a normally-opened valve, in a state in which a driver has begun a braking operation, there can be prevented a flow of the working liquid from the master cylinder to the reservoir through the communication control valve, whereby the pressure in the wheel cylinder can be reliably raised from the beginning of the braking operation. This can effectively eliminate deterioration in feeling, which would otherwise be caused by delay in pressure rise in the wheel cylinder and delay in actual braking action when the braking operation is performed, and can reliably enhance braking response at the time of beginning of the braking operation.

The communication control valve is opened by means of the suction pressure of the pressurizing supply means. However, since the operation of the pressurizing supply means is started in a state in which the communication valve is closed, as compared with the case where the communication control valve is a normally-opened valve, the suction pressure of the pressurizing supply means can be efficiently imposed on the communication control valve. This can activate a pressure-regulating action of the communication control valve on the pressure in the reservoir chamber at an early stage.

The above-mentioned vehicular braking apparatus may be configured as follows: until the suction pressure of the pressurizing supply means attains a predetermined value or greater, the working liquid can flow from the reservoir to the pressurizing supply means in a state in which the communication control valve maintains a closed condition.

According to the above configuration, even when the operation of the pressurizing supply means is started, until the suction pressure of the pressurizing supply means attains a predetermined value or greater, the working liquid flows to the pressurizing supply means in a state in which the communication control valve maintains a closed condition. Therefore, the pressurizing supply means can suck in the working liquid from the reservoir and supply a high-pressure working liquid from the beginning of its operation. This can reliably enhance the working-liquid supply performance of the pressurizing supply means at the time of beginning of the operation of the pressurizing supply means while preventing inflow of the working liquid into the reservoir from the master cylinder.

The above-mentioned vehicular braking apparatus may be configured as follows: the communication control valve has a normally-closed on-off valve, and valve-opening means for opening the on-off valve by being driven by means of the suction pressure of the pressurizing supply means; the valve-opening means includes a reciprocally movable member which is disposed within the reservoir in such a manner as to be reciprocally movable in a direction of opening and closing of the on-off valve and which is driven in a direction of opening of the on-off valve by means of the suction pressure of the pressurizing supply means; and the direction of opening of the on-off valve is a direction of reduction of a volume of the reservoir chamber.

According to the above configuration, the valve-opening means is driven by means of the suction pressure of the pressurizing supply means, thereby opening the normally-closed on-off valve. Thus, driving the pressurizing supply means can open the on-off valve via the valve-opening means. Also, timing of opening of the on-off valve can be adjusted by setting the relation between the on-off valve and the valve-opening means. Also, according to the above configuration, the valve-opening means includes the reciprocally movable member, and the reciprocally movable member is disposed within the reservoir in such a manner as to be reciprocally movable in the direction of opening and closing of the on-off valve and is driven in the direction of opening of the on-off valve by means of the suction pressure of the pressurizing supply means. Thus, the on-off valve can be opened by linearly displacing the reciprocally movable member in the direction of opening of the on-off valve by means of the suction pressure of the pressurizing supply means. Since the direction of opening of the on-off valve is the direction of reduction of the volume of the reservoir chamber, the working liquid can be reliably supplied to the pressurizing supply means from the reservoir chamber from the beginning of driving of the pressurizing supply means.

The above-mentioned vehicular braking apparatus may be configured as follows: when an amount of movement of the reciprocally movable member in the direction of opening of the on-off valve from a position at the time of nonbraking is equal to or less than a preset amount of idle movement, the valve-opening means does not open the on-off valve.

In the conventional braking apparatus as disclosed in the aforementioned publications, at the time of nonbraking, the reservoir piston is positioned at such a position as to minimize the volume of the reservoir chamber. Therefore, even when the pump begins to be driven, the reservoir piston cannot move in the direction of reduction of the volume of the reservoir chamber. Accordingly, the pump sucks in oil which flows into the reservoir chamber from the master cylinder through a narrow passage of the communication control valve. Thus, at the time of beginning of driving of the pump, the pump does not necessarily exhibit good oil supply performance.

By contrast, according to the above-mentioned configuration, even when the suction pressure of the pressurizing supply means causes the reciprocally movable member to move in the direction of opening of the on-off valve, if the amount of movement of the member is equal to or less than a preset amount of idle movement, the valve-opening means does not open the on-off valve, and thus the on-off valve maintains a closed condition. Thus, from the beginning of operation of the pressurizing supply means, the working liquid can be reliably supplied to the pressurizing supply means from the reservoir in a state in which the on-off valve is closed. This can reliably enhance the working-liquid supply performance of the pressurizing supply means at the time of beginning of operation of the pressurizing supply means without need of inflow of the working liquid into the reservoir chamber from the master cylinder through a narrow passage of the communication control valve.

The above-mentioned braking apparatus may be configured as follows: the reservoir has a housing, a reservoir piston which is disposed within the housing in a reciprocally movable manner and which defines the reservoir chamber in cooperation with the housing, and piston-urging means for urging the reservoir piston in the direction of reduction of the volume of the reservoir chamber, and the reservoir chamber communicates at all times with a suction side of the pressurizing supply means and communicates with the master cylinder via the communication control valve.

The above-mentioned configuration establishes a state in which the reservoir chamber communicates at all times with the suction side of the pressurizing supply means, and, according to the configuration, the communication control valve controls communication of the reservoir chamber with the master cylinder. Therefore, from the beginning of driving of the pressurizing supply means, the suction pressure of the pressurizing supply means can act on the communication control valve via the reservoir chamber, thereby beginning a pressure-regulating action of the communication control valve on the pressure in the reservoir chamber.

The above-mentioned vehicular braking apparatus may be configured as follows: the reciprocally movable member has a piston portion which is supported by the reservoir piston in such a manner as to be displaceable in relation to the reservoir piston in a direction of reciprocal movement of the reservoir piston, and a stem portion united with the piston portion and extending through the reservoir piston in the direction of reciprocal movement of the reservoir piston; the stem portion opens the on-off valve; and the piston portion and the stem portion, in cooperation with the reservoir piston, define a pressure chamber which communicates with the reservoir chamber at all times and functions as part of the reservoir chamber.

According to the above configuration, the piston portion is driven automatically according to the pressure in the pressure chamber equal to the pressure in the reservoir chamber, and the stem portion is united with the piston portion. Thus, the on-off valve can be opened and closed automatically according to the pressure in the reservoir chamber. Since, at the time of beginning of braking, the working liquid is supplied to the reservoir chamber from the pressure chamber, the working liquid can be supplied to the pressurizing supply means from the reservoir chamber without movement of the reservoir piston in relation to the housing in the direction of reduction of the volume of the reservoir chamber. Therefore, as compared with the case where the pressure chamber is not provided, from the beginning of braking, supply of a high-pressure working liquid from the pressurizing supply means can be ensured from the beginning of braking.

The above-mentioned vehicular braking apparatus may be configured as follows: the reciprocally movable member has a piston portion which is disposed on a side toward the master cylinder with respect to the reservoir piston and which is supported by the housing in such a manner as to be displaceable in relation to the reservoir piston in a direction of reciprocal movement of the reservoir piston, and a stem portion united with the piston portion and extending in the direction of reciprocal movement of the reservoir piston; the stem portion opens the on-off valve; and the piston portion defines the reservoir chamber in cooperation with the housing and the reservoir piston.

According to the above configuration, the on-off valve can be opened and closed automatically according to the pressure in the reservoir, and also the stem portion does not need to extend through the reservoir piston. Therefore, as compared with the preceding configuration, the reservoir and the communication control valve can be simplified in structure.

The above-mentioned vehicular braking apparatus may be configured as follows: when the suction pressure of the pressurizing supply means acts on the reservoir chamber in a state in which the on-off valve is closed and also in which the reservoir piston is positioned at such a position as to minimize a volume of the reservoir chamber, the reciprocally movable member is displaced in a direction of opening of the on-off valve, thereby reducing a working-liquid storage volume of the reservoir without movement of the reservoir piston.

According to the above configuration, even when the suction pressure of the pressurizing supply means acts on the reservoir chamber in a state in which the on-off valve is closed and also in which the reservoir piston is positioned at such a position as to minimize the volume of the reservoir chamber, the working-liquid storage volume of the reservoir reduces without movement of the reservoir piston. Therefore, the on-off valve can be opened by means of the suction pressure of the pressurizing supply means, while a state in which, from the beginning of braking, a high-pressure working fluid is supplied by the pressurizing supply means is ensured.

The above-mentioned vehicular braking apparatus may be configured as follows: the reservoir piston functions as the reciprocally movable member.

According to the above configuration, the reservoir piston functions as the reciprocally movable member, so that there is no need to provide the reciprocally movable member in the form of a member different from the reservoir piston. Therefore, as compared with the case where the reciprocally movable member is provided in the form of a member different from the reservoir piston, the structure of the valve-opening means can be simplified. This can facilitate the assembly of the reservoir and that of the valve-opening means and can reduce the number of components with a resultant reduction of cost.

The above-mentioned vehicular braking apparatus may be configured as follows: the on-off valve is a check valve which has a valve element and valve-element-urging means for urging the valve element against a valve seat and which closes through the valve element touching the valve seat and opens through the valve element moving away from the valve seat.

According to the above configuration, at the time of non-braking, the on-off valve can be maintained in a closed condition with the valve element touching the valve seat, and, at the time of braking, the valve-opening means, which is driven by means of the suction pressure of the pressurizing supply means, can move the valve element away from the valve seat, thereby opening the on-off valve.

The above-mentioned vehicular braking apparatus may be configured as follows: the valve element assumes the form of a poppet having a head portion and a spool portion smaller in diameter than the head portion and is supported at the spool portion by a valve housing in a reciprocally movable manner, and the on-off valve closes through the head portion touching the valve seat and opens through the head portion moving away from the valve seat.

According to the above configuration, merely by the valve element slightly moving in the direction of opening of the on-off valve, the on-off valve opens through the head portion moving away from the valve seat. Thus, as compared with the case where the on-off valve is a spool valve, the on-off valve can be efficiently opened and closed by means of the suction pressure of the pressurizing supply means. Also, since the on-off valve is supported at the spool portion by the valve housing in a reciprocally movable manner, as compared with the case where the on-off valve is a ball check valve, the valve element can be moved stably in the direction of opening and closing of the valve element, and thus the on-off valve can be opened and closed stably by means of the suction pressure of the pressurizing supply means.

The above-mentioned vehicular braking apparatus may be configured as follows: the on-off valve is a spool valve which opens and closes through reciprocal displacement of a spool, which serves as the valve element, in relation to a valve housing.

According to the above configuration, the on-off valve can be opened and closed by driving the spool valve by the valve-opening means, which is driven by means of the suction pressure of the pressurizing supply means. Also, since the pressure in the master cylinder does not act in a direction of movement of the spool serving as the valve element, there can be reliably avoided influence of the pressure in the master cylinder on opening and closing of the on-off valve.

The above-mentioned vehicular braking apparatus may be configured as follows: the valve element, in cooperation with the valve housing, defines a variable-volume chamber whose volume increases and decreases according to a reciprocal movement of the valve element so as to allow the reciprocal movement of the valve element, and has an internal passage for establishing communication at all times between the variable-volume chamber and the reservoir chamber.

According to the above configuration, there is defined the variable-volume chamber whose volume increases and decreases according to a reciprocal movement of the valve element so as to allow the reciprocal movement of the valve element, and the variable-volume chamber and the reservoir chamber communicate with each other at all times. Therefore, the pressure in the variable-volume chamber can be equal to the pressure in the reservoir chamber at all times, so that the valve element can be driven for opening and closing without imposition of an extra force on the valve element. Also, since the internal passage is provided in the valve element, as compared with, for example, a case where a valve housing or the like has a passage for establishing communication at all times between the variable-volume chamber and the reservoir chamber and a passage for opening the variable-volume chamber to the atmosphere, the structure of the communication control valve can be simplified. Furthermore, since the variable-volume chamber can be a chamber different from a valve chamber which communicates with the master cylinder, the pressure in the valve chamber can be prevented from acting on the valve element in a direction of opening and closing of the on-off valve.

The above-mentioned vehicular braking apparatus may be configured as follows: the spool is united with the stem portion of the reciprocally movable member.

According to the above configuration, as compared with the case where the spool is a member different from the stem portion of the plunger, the number of components is reduced, and the on-off valve and the valve-opening means are simplified in structure. Thus, the assembly of the communication control valve can be facilitated.

The above-mentioned vehicular braking apparatus may be configured as follows: the reservoir has a housing, a reservoir piston which is disposed within the housing in a reciprocally movable manner and which defines the reservoir chamber in cooperation with the housing, first piston-urging means for urging the reservoir piston in the direction of reduction of a volume of the reservoir chamber, and second piston-urging means for urging the reservoir piston in a direction of increase of the volume of the reservoir chamber; the reservoir piston has an internal passage which communicates at all times with the reservoir chamber through one end of the internal passage; the reservoir piston functions as a spool of the communication control valve in such a manner as to be movable between a valve-closing position where communication of the internal passage with the master cylinder through the other end of the internal passage is shut off, and a valve-opening position where communication of the internal passage with the master cylinder through the other end of the internal passage is established as a result of the reservoir piston moving in the direction of reduction of the volume of the reservoir chamber from the valve-closing position; and the first and second piston-urging means set a position of the reservoir piston in relation to the housing in such a manner that, at the time of nonbraking, the communication control valve is closed.

According to the above configuration, the reservoir piston also functions as the spool of the communication control valve. Thus, as compared with the case where the communication control valve is provided separately from the reservoir piston, the structure of the communication control valve can be simplified, and the reservoir and the communication control valve can be formed in a single compact unit. This can facilitate the assembly of the braking apparatus. Also, since the pressure in the master cylinder does not act in a direction of movement of the reservoir piston, which functions as the spool of the communication control valve, there can be reliably avoided influence of the pressure in the master cylinder on opening and closing of the communication control valve.

The above-mentioned vehicular braking apparatus may be configured as follows: the reservoir further has urge-limiting means for limiting a range in which the second piston-urging means urges the reservoir piston, in relation to a range of a reciprocal movement of the reservoir piston.

According to the above configuration, the urge-limiting means limits the range of the second piston-urging means urging the reservoir piston. Thus, the position of the reservoir piston at the time of nonbraking can be set to a predetermined position. Also, as compared with the case where the urge-limiting means is not provided, the reservoir piston can stably undergo a reciprocal movement.

The above-mentioned vehicular braking apparatus may be configured as follows: the on-off valve is a check valve which has a valve element and valve-element-urging means for urging the valve element against a valve seat and which closes through the valve element touching the valve seat and opens through the valve element moving away from the valve seat; the reservoir piston has a portion which functions as the valve-opening means; and the reservoir further has urge-limiting means for limiting a range in which the piston-urging means urges the reservoir piston to a range within which the portion functioning as the valve-opening means does not open the on-off valve, in relation to a range of a reciprocal movement of the reservoir piston.

According to the above configuration, the on-off valve is a check valve, and the reservoir piston has a portion which functions as the valve-opening means. Thus, as compared with the case where the valve-opening means is a member which is independent of the reservoir piston, the reservoir and the communication control valve can be simplified in structure, and the assembly of the communication control valve can be facilitated. Also, since the urge-limiting means limits the range of the piston-urging means urging the reservoir piston, the position of the reservoir piston at the time of nonbraking can be set to a predetermined position. Also, as compared with the case where the urge-limiting means is not provided, the reservoir piston can stably undergo a reciprocal movement.

The above-mentioned vehicular braking apparatus may be configured as follows: even when the suction pressure of the pressurizing supply means acts on the reservoir chamber in a state in which the on-off valve is closed and also in which the urge-limiting means limits an action of the piston-urging means urging the reservoir piston, the reservoir piston is displaced in a direction of opening of the on-off valve, thereby reducing the volume of the reservoir chamber.

According to the above configuration, even when the suction pressure of the pressurizing supply means acts on the reservoir chamber in the state in which the on-off valve is closed and also in which the urge-limiting means limits an action of the piston-urging means urging the reservoir piston, the reservoir piston is displaced in the direction of opening of the on-off valve, and thus the volume of the reservoir chamber reduces. Therefore, while a state in which a high-pressure working fluid is supplied by the pressurizing supply means from the beginning of braking is ensured, the on-off valve can be opened by means of the suction pressure of the pressurizing supply means.

The above-mentioned vehicular braking apparatus may be configured as follows: the on-off valve is a check valve which has a valve element and valve-element-urging means for urging the valve element against a valve seat and which closes through the valve element touching the valve seat and opens through the valve element moving away from the valve seat; the reservoir piston has a portion which functions as the valve-opening means; and, in a state in which the valve element touches the valve seat and also in which the portion touches the valve element, a force which the valve-element-urging means applies to the valve element for urging the valve element is greater than a force which the piston-urging means applies to the reservoir piston for urging the reservoir piston.

According to the above configuration, the on-off valve is a check valve; the reservoir piston has a portion which functions as the valve-opening means; and, in a state in which the on-off valve is closed and also in which the portion functioning as the valve-opening means touches the valve element, a force which the valve-element-urging means applies to the valve element for urging the valve element is greater than a force which the piston-urging means applies to the reservoir piston for urging the reservoir piston. Thus, as compared with the case where the valve-opening means is a member which is independent of the reservoir piston, the reservoir and the communication control valve can be simplified in structure, and thus the assembly of the reservoir and that of the communication control valve can be facilitated. Also, at the time of nonbraking, the check valve can be reliably maintained in a closed condition.

According to another particular feature of the present invention, the above-mentioned configurations may be as follows: when the pressure in the master cylinder assumes a predetermined value or greater as a result of a driver beginning a braking operation, the shut-off valve shuts off a flow of the working liquid from the master cylinder to the wheel cylinder, the pressurizing supply means is driven, and the shut-off valve ensures a differential pressure between the master cylinder and a supply side of the pressurizing supply means.

According to another particular feature of the present invention, the above-mentioned configurations may be as follows: the valve-opening means includes reciprocally-movable-member-urging means for urging the reciprocally movable member in a direction of allowing of closing of the on-off valve.

According to another particular feature of the present invention, the above-mentioned configurations may be as follows: the valve-opening means includes reciprocally-movable-member-urging means for urging the reciprocally movable member in a direction of increase of the volume of the pressure chamber, and an urging force of the reciprocally-movable-member-urging means is greater than an urging force of the piston-urging means.

According to another particular feature of the present invention, the above-mentioned configurations may be as follows: the reservoir has reservoir-piston-restricting means for restricting movement of the reservoir piston in a direction of reduction of the volume of the reservoir chamber.

According to another particular feature of the present invention, the above-mentioned configurations may be as follows: at the time of nonbraking, the valve-opening means is spaced from the valve element of the on-off valve.

According to another particular feature of the present invention, the above-mentioned configurations may be as follows: the valve-opening means may be configured in such a manner as to touch the valve element of the on-off valve via an elastic element and to move the valve element of the on-off valve via the elastic element.

According to another particular feature of the present invention, the above-mentioned configurations may be as follows: the on-off valve is a ball check valve.

According to another particular feature of the present invention, the above-mentioned configurations may be as follows: an effective sectional area of the spool portion is smaller than a communication shut-off area which is defined by a contact portion between the head portion and the valve seat when the on-off valve is closed.

According to another particular feature of the present invention, the above-mentioned configurations may be as follows: the valve element, in cooperation with the valve housing, defines a valve chamber which communicates with the master cylinder at all times, and, when the valve element moves away from the valve seat, the valve chamber communicates with the reservoir chamber.

According to another particular feature of the present invention, the above-mentioned configurations may be as follows: when the spool moves to a valve-opening position, the valve-opening means opens the on-off valve by establishing communication between a passage on the spool side and a passage on the valve-housing side, and, at the time of nonbraking, the passage on the spool side and the passage on the valve-housing side are spaced from each other in a direction of reciprocal displacement of the spool.

According to another particular feature of the present invention, the above-mentioned configurations may be as follows: the on-off valve includes spool-urging means for urging the spool toward a valve-closing position of the spool valve.

According to another particular feature of the present invention, the above-mentioned configurations may be as follows: the valve-opening means includes reciprocally-movable-member-urging means, and the reciprocally-movable-member-urging means urges the spool in a direction opposite a direction in which the reciprocally movable member is moved by means of the suction pressure of the pressurizing supply means.

According to another particular feature of the present invention, the above-mentioned configurations may be as follows: an urging force of the reciprocally-movable-member-urging means is greater than an urging force of the piston-urging means.

According to another particular feature of the present invention, the above-mentioned configurations may be as follows: at the time of ordinary braking when a braking operation is carried out, but antiskid control is not performed, the pressure in the master cylinder is applied to the wheel cylinder via the shut-off valve in a state in which the pressurizing supply means is not driven and also in which the communication control valve is closed.

According to another particular feature of the present invention, the above-mentioned configurations may be as follows: at the time of braking when antiskid control is performed, the pressurizing supply means is driven, but the communication control valve is maintained in a closed condition, and the pressure increase-decrease control valve carries out control so as to achieve an increase in the pressure in the wheel cylinder through supply of a high-pressure working liquid from the pressurizing supply means to the wheel cylinder and a decrease in the pressure in the wheel cylinder through drainage of the working liquid from the wheel cylinder to the reservoir chamber, whereby the pressure in the wheel cylinder is controlled so as to assume a value corresponding to the pressure in the master cylinder and a value required to restrain a braking slip of a wheel.

According to another particular feature of the present invention, the above-mentioned configurations may be as follows: at the time of automatic braking, the pressurizing supply means is driven, and the communication control valve is opened by means of the suction pressure of the pressurizing supply means to thereby establish a state in which the working liquid in the master cylinder is supplied to a suction side of the pressurizing supply means via the communication control valve and the reservoir chamber; subsequently, opening and closing of the communication control valve is controlled by means of the pressure in the master cylinder and the suction pressure in the pressurizing supply means, and the pressure increase-decrease control valve carries out control so as to achieve an increase in the pressure in the wheel cylinder through supply of a high-pressure working liquid from the pressurizing supply means to the wheel cylinder and a decrease in the pressure in the wheel cylinder through drainage of the working liquid from the wheel cylinder to the reservoir chamber, whereby the pressure in the wheel cylinder is controlled to a target pressure.

BEST MODE FOR CARRYING OUT THE INVENTION

Preferred embodiments of the present invention will next be described in detail with reference to the accompanying drawings.

First Embodiment

Figure 1:
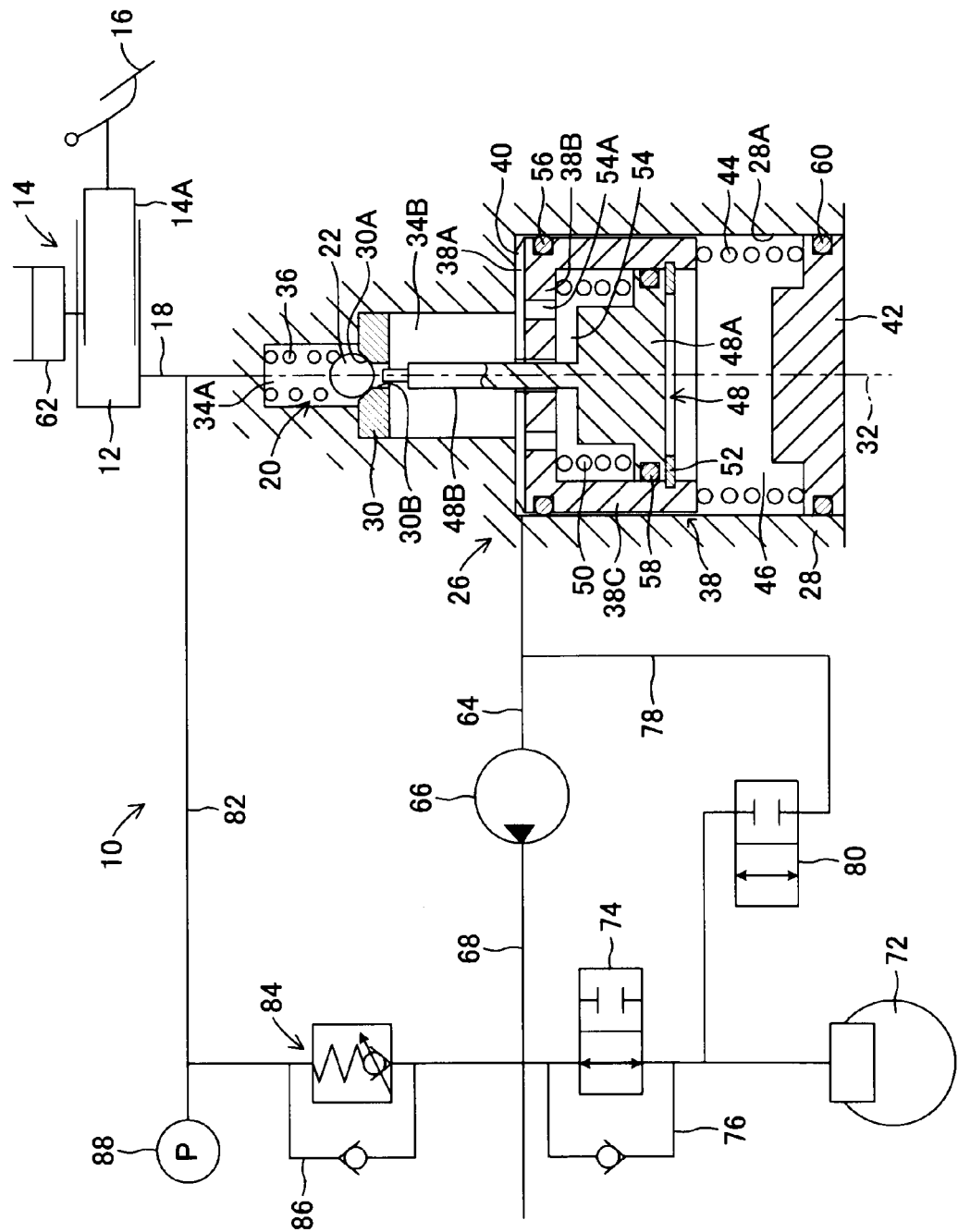
FIG. 1 is a schematic, configurational view showing a first embodiment of a vehicular braking apparatus according to the present invention and having a ball-check-valve-type communication control valve and a reservoir.

FIG. 1 is a schematic, configurational view showing a first embodiment of a vehicular braking apparatus according to the present invention and having a ball-check-valve-type communication control valve and a reservoir.

In FIG. 1, a braking apparatus 10 includes a master cylinder 14, which has a master cylinder chamber 12 therein. A piston 14A of the master cylinder 14 is linked to a brake pedal 16. In response to a driver's operation of treading on the brake pedal 16, an oil pressure (master cylinder pressure Pm) is generated within the master cylinder chamber 12 according to a force of treading on the brake pedal. The master cylinder 14 may be equipped with a known booster for increasing a pressure in the master cylinder chamber 12 in proportion to a force of treading on the brake pedal.

One end of a master pipe 18 is connected to the master cylinder chamber 12, and the other end of the master pipe 18 is connected to a communication control valve 20. The communication control valve 20 of the present embodiment is a normally-closed check valve which has a ball 22 as a valve element. A housing of the communication control valve 20 is integral with a housing 28 of a reservoir 26, so that the communication control valve 20 and the reservoir 26 can be incorporated as a single unit in the braking apparatus 10. A valve seat member 30 is, for example, press-fitted into the housing 28 and is thus disposed in a fixed condition. The valve seat member 30 has a conical valve seat 30A, which is aligned with an axis 32 of the communication control valve 20, and a communication hole 30B, which establishes communication between valve chambers 34A and 34B located on opposite sides of the valve seat member 30.

The other end of the master pipe 18 is connected to the valve chamber 34A, which is located on a side toward the master pipe 18 with respect to the valve seat member 30. The ball 22 is disposed within the valve chamber 34A. The ball 22 is urged against the valve seat 30A by a compression coil spring 36 elastically disposed between the ball 22 and an end wall of the valve chamber 34A. As a result, the communication control valve 20 is normally closed through the ball 22 touching the valve seat 30A, thereby shutting off communication between the valve chamber 34A and the valve chamber 34B.

The housing 28 of the reservoir 26 has a cylinder bore 28A. A reservoir piston 38 is disposed within the cylinder bore 28A in such a manner as to be reciprocally movable along the axis 32. The reservoir piston 38, in cooperation with the housing 28, defines a reservoir chamber 40 whose volume is variable. The reservoir chamber 40 communicates with the valve chamber 34B at all times. Particularly, in the illustrated embodiment, a plurality of land portions 38A are formed on an end face of the reservoir piston 38. In a state in which the land portions 38A touch an end face of the cylinder bore 28A, the volume of the reservoir chamber 40 is minimized.

An end cap 42 is fixed, by, for example, press-fitting or screwing, to an end portion of the cylinder bore 28A, which is located on a side opposite the reservoir chamber 40 with respect to the reservoir piston 38. A compression coil spring 44 is elastically disposed between the reservoir piston 38 and the end cap 42. The compression coil spring 44, which serves as piston-urging means, urges the reservoir piston 38 along the axis 32 in a direction of reduction of the volume of the reservoir chamber 40 so that the land portions 38A touch the end face of the cylinder bore 28A. The reservoir piston 38 and the end cap 42, in cooperation with the housing 28, define an air chamber 46 whose volume is variable. The air chamber 46 opens to the atmosphere through an unillustrated communication hole.

The reservoir piston 38 has a disk portion 38B located on a side toward the reservoir chamber 40, and a cylindrical portion 38B integral with the disk portion 38C and extending along the axis 32 on a side toward the air chamber 46 with respect to the disk portion 38B. A piston portion 48A of a plunger 48, which serves as a reciprocally movable member, is disposed within the cylindrical portion 38C and is supported by the cylindrical portion 38C in such a manner as to be displaceable along the axis 32 in relation to the reservoir piston 38. A compression coil spring 50 is elastically disposed between the disk portion 38B and the piston portion 48A. The compression coil spring 50 urges the piston portion 48A along the axis 32 toward the end cap 42 so that the piston portion 48A touches a C ring 52 fixed to the cylindrical portion 38B.

The plunger 48 has a stem portion 48B integral with the piston portion 48A and extending along the axis 32 through the disk portion 38B. The piston portion 48A and the stem portion 48B define a pressure chamber 54 in cooperation with the reservoir piston 38. The pressure chamber 54 communicates with the reservoir chamber 40 through communication holes 54A formed in the disk portion 38B. Accordingly, the pressure in the pressure chamber 54 is held equal to the pressure in the reservoir chamber 40 at all times.

The length of the stem portion 48B is set such that, in a state in which the land portions 38A of the reservoir piston 38 touch an inner surface of the housing 28 and also in which the piston portion 48A touches the C ring 52, an end portion of the stem portion 48B is loosely fitted into the communication hole 30B of the valve seat member 30 and also such that an end face of the end portion of the stem portion 48B is slightly spaced from the ball 22 of the communication control valve 20. The length of the stem portion 48B may be set such that, in a state in which the land portions 38A of the reservoir piston 38 touch the inner surface of the housing 28 and also in which the piston portion 48A touches the C ring 52, the end face of the end portion of the stem portion 48B touches the ball 22 without substantially pressing the ball 22.

In the first embodiment, the compression coil springs 44 and 50 may be in any relation with each other in terms of magnitude of spring force; however, the spring forces of the compression coil springs 44 and 50 are set so as to overcome a frictional slide resistance associated with movement of corresponding members. Thus, at the time of nonbraking, the reservoir piston 38 and the plunger 48 are positioned at respective standard positions shown in FIG. 1; i.e., positioned such that the land portions 38A of the reservoir piston 38 touch the inner surface of the housing 28 and such that the piston portion 48A touches the C ring 52. The end face of an end portion of the stem portion 48B is slightly spaced from the ball 22 of the communication control valve 20.

In a state in which the reservoir piston 38 and the plunger 48 are positioned at the respective standard positions, when the pressure in the reservoir chamber 40 and the pressure chamber 54 drops, the plunger 48 is displaced along the axis 32 in relation to the reservoir piston 38 such that the piston portion 48A approaches the disk portion 38B against the spring force of the compression coil spring 50. Accordingly, an end of the stem portion 48B moves the ball 22 away from the valve seat 30A against the spring force of the compression coil spring 36. Therefore, the plunger 48 is driven through drop in the pressure in the reservoir chamber 40 and the pressure chamber 54, thereby functioning as valve-opening means for opening the communication control valve 20.

The valve chambers 34A and 34B, the reservoir chamber 40, and the pressure chamber 54 are filled with oil, which serves as a working liquid. In FIG. 1, reference numerals 56 to 60 denote respective seal rings for preventing leakage of oil from between associated members. Furthermore, in FIG. 1, reference numeral 62 denotes a master cylinder reservoir for replenishing the master cylinder chamber 12 with oil as needed.

One end of an oil supply/drain pipe 64 is connected to the reservoir chamber 40, and the other end of the oil supply/drain pipe 64 is connected to a suction side of an oil pump 66, which is driven by an unillustrated motor. The oil pump 66 is controlled by means of an unillustrated electronic control unit controlling a drive current for the motor.

An oil supply pipe 68 is connected to a discharge side of the oil pump 66, and one end of an oil supply/drain pipe 70 is connected to the oil supply pipe 68. The other end of the oil supply/drain pipe 70 is connected to a wheel cylinder 72. A normally-opened solenoid on-off valve 74, which serves as a pressure increase control valve, for controlling supply of oil to the wheel cylinder 72 is provided at an intermediate portion of the oil supply/drain pipe 70. A one-way bypass pipe 76 for only allowing a flow of oil from the wheel cylinder 72 toward the oil supply pipe 68 is connected to the oil supply/drain pipe 70 on both sides of the solenoid on-off valve 74.

One end of an oil drain pipe 78 is connected to the oil supply/drain pipe 70 extending between the solenoid on-off valve 74 and the wheel cylinder 72. The other end of the oil drain pipe 78 is connected to the oil supply/drain pipe 64 extending between the reservoir 26 and the oil pump 66. A normally-closed solenoid on-off valve 80, which serves as a pressure decrease control valve, for draining oil from the wheel cylinder 72 is provided at an intermediate portion of the oil drain pipe 78. The solenoid on-off valves 74 and 80 are opened and closed by means of the electronic control unit controlling control currents for respective solenoids (not shown).

Figure 8:
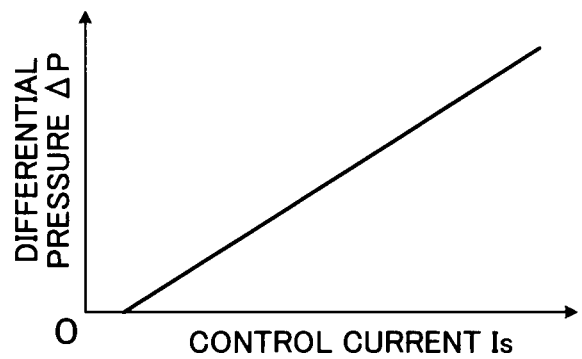
FIG. 8 is a graph showing the relation between control current Is for a linear solenoid valve and differential pressure ΔP across the linear solenoid valve in the first embodiment.

One end of a connection pipe 82 is connected to the oil supply pipe 68, and the other end of the connection pipe 82 is connected to the master pipe 18. A linear solenoid valve 84 having a known structure is provided at an intermediate portion of the connection pipe 82. At normal time, the linear solenoid valve 84 only allows a flow of oil from a side of the oil supply pipe 68 to a side of the master pipe 18. A differential pressure ΔP across the linear solenoid valve 84 (a pressure on the side of the oil supply pipe 68 is higher than a pressure on the side of the connection pipe 82) is controlled by means of the electronic control unit controlling a control current Is for a solenoid (not shown) of the linear solenoid valve 84 (see FIG. 8).

A one-way bypass pipe 86 for only allowing a flow of oil from the side of the master pipe 18 to the side of the oil supply pipe 68 is connected to the connection pipe 82 on both sides of the linear solenoid valve 84. A pressure sensor 88 is connected to the connection pipe 82 extending between the linear solenoid valve 84 and the master pipe 18. The pressure sensor 88 detects a pressure P in the connection pipe 82 as a master cylinder pressure Pm. Accordingly, the linear solenoid valve 84 and the one-way bypass pipe 86 function as a shut-off valve for shutting off a flow of oil from the wheel cylinder 72 to the master cylinder 14 as needed and for controlling the differential pressure ΔP across the linear solenoid valve 84 as needed.

Although unillustrated in FIG. 1, the oil supply/drain pipe 70, the oil drain pipe 78, the wheel cylinder 72, the solenoid on-off valves 74 and 80, the one-way bypass pipe 76, etc. are provided for each of wheels. The linear solenoid valve 84 and the one-way bypass pipe 86 may be provided for each of wheels; however, in the case where the braking apparatus 10 is a two-system braking apparatus consisting of a front-wheel system corresponding to left and right front wheels and a rear-wheel system corresponding to left and right rear wheels, the linear solenoid valve 84 and the one-way bypass pipe 86 for the front-wheel system and those for the rear-wheel system may be provided. In the case where the braking apparatus 10 is a two-system braking apparatus consisting of a first system corresponding to the left front wheel and the right rear wheel and a second system corresponding to the right front wheel and the left rear wheel, the linear solenoid valve 84 and the one-way bypass pipe 86 for the first system and those for the second system may be provided.

Next, the operation of the thus-configured braking apparatus 10 according to the first embodiment will be described for each case of ordinary braking, antiskid control (ABS control in the present application), and automatic braking.

(1) At the Time of Beginning of Braking

Even when a driver begins a braking operation, a drive current is not applied to the motor of the oil pump 66, and no control current is supplied to the solenoid on-off valves 74 and 80 and to the linear solenoid valve 84. Accordingly, since the oil pump 66 is not driven, the communication control valve 20 is maintained in a closed condition; the solenoid on-off valve 74 is maintained in an opened condition; and the solenoid on-off valve 80 is maintained in a closed condition. Thus, all of oil flowing out from the master cylinder chamber 12 to the master pipe 18 is supplied to the wheel cylinder 72 via the linear solenoid valve 84 and the solenoid on-off valve 74. Thus, the pressure in the wheel cylinder 72 is efficiently increased.

(2) At the Time of Ordinary Braking

At the time of ordinary braking when a driver carries out a braking operation, but ABS control is not performed, a drive current is not applied to the motor of the oil pump 66, and no control current is supplied to the solenoid on-off valves 74 and 80 and to the linear solenoid valve 84. Accordingly, the master cylinder chamber 12 and the wheel cylinder 72 are maintained in such a state as to communicate with each other via the linear solenoid valve 84 and the solenoid on-off valve 74. Therefore, the pressure in the wheel cylinder 72 is controlled by the pressure in the master cylinder chamber 12 so as to become identical with the pressure in the master cylinder chamber 12.

(3) At the Time of ABS Control

When a braking slip of a wheel becomes excessive due to an excessive amount of braking operation by a driver, ABS control is performed for reducing the braking slip of a wheel. In ABS control, the pressure in the wheel cylinder 72 must be controlled independently of the pressure in the master cylinder chamber 12. Therefore, once known ABS control startup conditions are established, until ABS control ending conditions, which are also known, are established, a drive current is applied to the motor of the oil pump 66, and the solenoid on-off valves 74 and 80 are opened and closed according to a braking slip ratio or braking slip amount of the wheel without application of the control current Is to a solenoid 84A of the linear solenoid valve 84. By this procedure, the pressure in the wheel cylinder 72 is increased and decreased so as to assume a value which corresponds to the master cylinder pressure Pm and is required for restraining a braking slip of the wheel. Thus is reduced a braking slip of the wheel.

In this case, ABS control begins by decreasing the pressure in the wheel cylinder 72. Oil in the wheel cylinder 72 flows to the reservoir chamber 40 via the solenoid on-off valve 80. As a result, the amount of oil in the reservoir chamber 40 increases transiently. When the pressure in the wheel cylinder 72 is to be increased, the oil pump 66 sucks in oil from the reservoir chamber 40. As a result, the amount of oil in the reservoir chamber 40 decreases. However, the amount of oil in the reservoir chamber 40 does not become smaller than that at the time of ordinary braking when ABS control is not performed. Thus, the amount of oil in the reservoir chamber 40 and the pressure chamber 54 does not become smaller than that at the time of ordinary braking. Therefore, the communication control valve 20 is not opened by the plunger 48 and is maintained in a closed condition.

In the case of control of a hydroassist brake, which makes the pressure in the wheel cylinder 72 higher than the master cylinder pressure Pm and increases and decreases the pressure in the wheel cylinder 72 according to the increase and decrease of the master cylinder pressure Pm, the control current Is is applied to the solenoid 84A of the linear solenoid valve 84 so that the pressure in the wheel cylinder 72 of each wheel attains a target wheel cylinder pressure based on the master cylinder pressure Pm. The oil pump 66 is driven in association with differential-pressure control by the linear solenoid valve 84. The same convention also applies to other embodiments to be described later.

(4) At the Time of Automatic Braking

At the time of automatic braking which controls at least braking force, such as vehicular behavior control, autocruise control, and following-distance control, a drive current is applied to the motor of the oil pump 66; the control current Is is applied to the solenoid 84A of the linear solenoid valve 84 so that the differential pressure ΔP across the linear solenoid valve 84 assumes a predetermined value based on, for example, a target pressure in the wheel cylinder 72 which is required by automatic braking; and the solenoid on-off valves 74 and 80 are opened and closed as needed so that the pressure in the wheel cylinder 72 attains the target pressure. Thus is achieved automatic braking.

In this case, the oil pump 66 sucks in much oil from the reservoir chamber 40. Thus, when the pressure in the reservoir chamber 40 and the pressure chamber 54 becomes lower than in the case of ordinary braking and ABS control, the plunger 48 is displaced in relation to the reservoir piston 38 along the axis 32 such that the piston portion 48A approaches the disk portion 38A against the spring force of the compression coil spring 50. Thus, the end of the stem portion 48B moves the ball 22 away from the valve seat 30A against the spring force of the compression coil spring 36. Thus is opened the communication control valve 20.

Accordingly, oil in the reservoir chamber 40 flows out to the oil pump 66 through the oil supply/drain pipe 64, and also oil in the master cylinder chamber 12 flows into the reservoir chamber 40 through the master pipe 18 and the communication valve 20. In this manner, the communication control valve 20 activates a pressure-regulating action so that the pressure in the reservoir chamber 40 and the pressure chamber 54 attains a predetermined pressure.

Upon completion of automatic braking, by means of opening the linear solenoid valve 84, excess oil in the braking apparatus 10 is returned to the master cylinder reservoir 62 through the connection pipe 82. The same convention also applies to other embodiments to be described later.

As described above, according to the first embodiment, the communication control valve 20 is a normally-closed ball check valve and is maintained in a closed condition at the time of nonbraking. Upon commencement of a braking operation by a driver, this prevents a portion of oil in the master cylinder chamber 12 from flowing into the reservoir chamber 40 via the communication control valve 20, so that all of oil flowing out to the master pipe 18 from the master cylinder chamber 12 can be supplied to the wheel cylinder 72 via the linear solenoid valve 84 and the solenoid on-off valve 74. Therefore, from the beginning of a braking operation by the driver, the pressure in the wheel cylinder 72 can be efficiently raised. This can effectively eliminate deterioration in feeling, which would otherwise be caused by delay in pressure rise in the wheel cylinder and delay in actual braking action when the braking operation is performed, and can reliably enhance braking response at the time of beginning of the braking operation.

Figure 9:
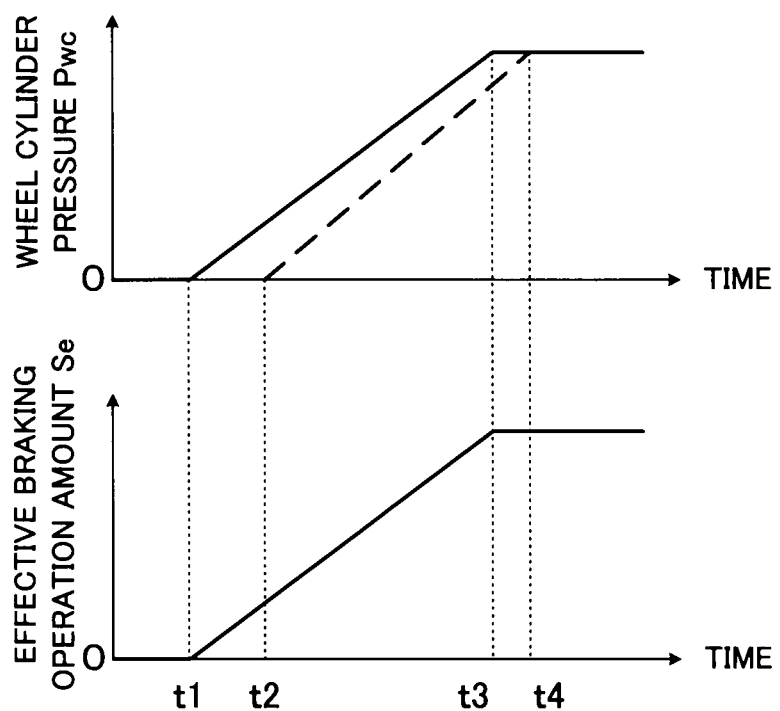
FIG. 9 is a graph exemplifying variation of pressure Pwc in a wheel cylinder with variation of effective braking operation amount Se by a driver in the vehicular braking apparatus according to the first embodiment and in a conventional vehicular braking apparatus.

For example, as shown in FIG. 9, at time t1, an effective amount Se of a driver's braking operation (a braking operation amount excluding a play of a braking pedal and the like) begins to rise from 0; at time t3, the effective braking operation amount Se reaches a certain value Sec; and subsequently, the effective braking operation amount Se is maintained at the value Sec. In the case of the conventional braking apparatus in which the communication control valve is a normally-opened valve, as represented by the broken line in FIG. 9, even when the effective amount Se of the driver's braking operation (a braking operation amount excluding a play of a braking pedal and the like) rises from 0, since a portion of oil in the master cylinder chamber flows into the reservoir chamber via the communication control valve, a pressure Pwc in the wheel cylinder begins to rise at time t2, which is later than time t1, and reaches a pressure Pwcc corresponding to a value Sec at time t4, which is later than time t3. Thus, the occurrence of delay in pressure rise in the wheel cylinder is unavoidable.

By contrast, according to the first embodiment, the communication control valve 20 is a normally-closed check valve, thereby eliminating the drawback in which a portion of oil in the master cylinder chamber 12 flows into the reservoir chamber 40 via the communication control valve 20. This enables the following action: in response to a rise in the effective braking operation amount Se by the driver, the pressure Pwc in the wheel cylinder rises substantially from time t1 and reaches the pressure Pwcc corresponding to the value Sec at time t3, which is earlier than time t4.

Also, at the time of ABS control and automatic braking, the pump 66 is driven, and the communication control valve 20 is opened via the plunger 48 by means of the suction pressure of the pump 66, which serves as pressurizing supply means. However, the driving of the pump 66 begins in a state in which the communication control valve 20 is closed. Thus, as compared with the case where the communication control valve is a normally-opened valve, the pressure in the reservoir chamber 40 can be lowered efficiently by an action of suction of the pump 66. By virtue of this, the suction pressure of the pump 66 can be applied efficiently to the communication control valve 20 via the plunger 48. Therefore, the pressure-regulating action of the communication control valve 20 on the pressure in the reservoir chamber 40 can be activated early enough.

In this case, even when the driving of the pump 66 is started, and thus the pressure in the reservoir chamber 40 and the pressure chamber 54 begins to lower, the communication control valve 20 is maintained in a closed condition until the pressure in the reservoir chamber 40 and the pressure chamber 54 assumes a predetermined value; i.e., until a valve-opening drive force which the plunger 48 applies to the ball 22 overcomes the sum of a force derived from the differential pressure between the valve chamber 34A and the valve chamber 34B and a spring force which the compression coil spring 36 applies to the ball 22 in a valve-closing direction. Accordingly, at the time of ABS control, even when the pump 66 is driven, while inflow of a portion of oil contained in the master cylinder chamber 12 into the reservoir chamber 40 via the communication control valve 20 is prevented, high-pressure oil can be supplied by the pump 66.

Particularly, according to the first embodiment, the stem portion 48B of the plunger 48, which serves as the valve-opening means for opening the communication control valve 20, is a member which is independent of the ball 22, which serves as a valve element of the communication control valve 20. Thus, as compared with the case where the communication control valve 20 and the plunger 48 are united together, the degree of freedom can be increased with respect to setting of the relation between the communication control valve 20 and the plunger 48. Also, as long as the communication control valve 20 is in a closed condition, the spring forces of the compression coil springs 44 and 50 do not influence a spring force required to maintain the communication control valve 20 in a closed condition. Therefore, at the time of nonbraking, the compression coil spring 36, which urges the ball 22 to a valve-closing position, can maintain the communication control valve 20 in a closed condition, irrespective of the spring forces of the compression coil springs 44 and 50.

Also, according to the first embodiment, at the time of nonbraking, the end of the stem portion 48B of the plunger 48 is spaced from the ball 22 of the communication control valve 20. Even when the plunger 48 is driven in the direction of opening of the communication control valve 20 by means of the suction pressure of the pump 66, until the end of the stem portion 48B touches the ball 22, the stem portion 48B moves idly without contributing to opening of the valve. Thus, while the communication control valve 20 is maintained in a closed condition, the plunger 48 moves to reduce the volume of the pressure chamber 54, so that oil in the pressure chamber 54 is supplied to the suction side of the pump 66 via the communication holes 54A, the reservoir chamber 40, and the oil supply/drain pipe 64. Therefore, the pump 66 can reliably supply high-pressure oil from the beginning of driving thereof, thereby ensuring good oil supply performance at the beginning of driving of the pump.

Second Embodiment

Figure 2:
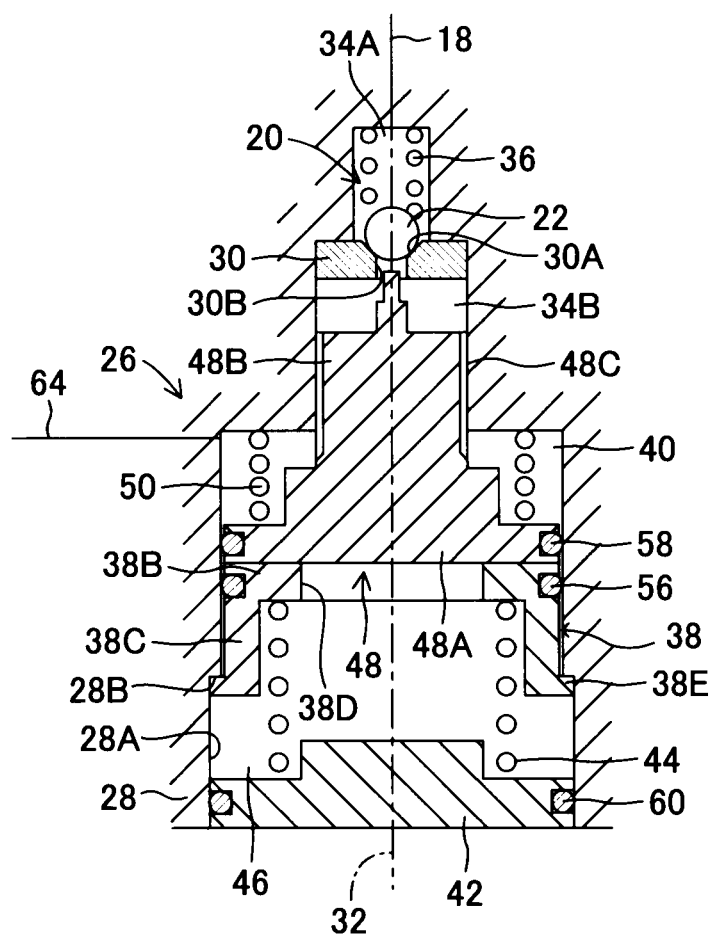
FIG. 2 is a sectional view showing a ball-check-valve-type communication control valve and a reservoir of a second embodiment of a vehicular braking apparatus according to the present invention.

FIG. 2 is a sectional view showing a ball-check-valve-type communication control valve and a reservoir of a second embodiment of a vehicular braking apparatus according to the present invention. In FIG. 2, the same members as those shown in FIG. 1 are denoted by the same reference numerals as those in FIG. 1. The same convention also applies to other embodiments to be described later.

In the second embodiment, the reservoir piston 38 does not have land portions corresponding to the land portions 38A of the above-described first embodiment. The disk portion 38B of the reservoir piston 38 has a hole 38D at the center. The cylindrical portion 38C has a large-diameter portion 38E at an end portion located on a side opposite the disk portion 38B. The cylinder bore 28A of the housing 28 of the reservoir 26 has a shoulder portion 28B. The compression coil spring 44, which serves as piston-urging means, urges the reservoir piston 38 toward the communication control valve 20 along the axis 32 such that the large-diameter portion 38E touches the shoulder portion 28B.

The piston portion 48A of the plunger 48 is disposed within the cylinder bore 28A of the housing 28 of the reservoir 26 on a side toward the communication control valve 20 with respect to the disk portion 38B of the reservoir piston 38. The piston portion 48A is fitted into the cylinder bore 28A in such a manner as to be displaceable in relation to the housing 28 and to the reservoir piston 38. Thus, the piston portion 48A, in cooperation with the housing 28, defines the reservoir chamber 40 whose volume is variable. Particularly, when the volume of the reservoir chamber 40 is greater than a volume shown in FIG. 2, the plunger 48 is displaced in relation to the housing 28 in a unitary manner with the reservoir piston 38; thus, the piston portion 48A functions as a portion of the reservoir piston 38.

The compression coil spring 50 is elastically disposed between the piston portion 48A and an end wall of the cylinder bore 28A and urges the piston portion 48A toward the reservoir piston 38 along the axis 32 such that the piston portion 48A touches the disk portion 38B of the reservoir piston 38. Urging forces of the compression coil springs 44 and 50 are set such that, in a state in which the large-diameter portion 38E of the reservoir piston 38 touches the shoulder portion 28B and also in which the piston portion 48A touches the disk portion 38B of the reservoir piston 38, the urging force which the compression coil spring 44 applies to the reservoir piston 38 is greater than the urging force which the compression coil spring 50 applies to the piston portion 48A. Notably, the compression coil spring 50 may be omitted.

The stem portion 48B of the plunger 48 has a large-diameter portion which is fitted into the housing 28 in a reciprocally movable manner and which defines the valve chamber 34B in cooperation with the housing 28 and the valve seat member 30. An outer surface of the large-diameter portion has a plurality of grooves 48C extending along the axis 32. The grooves 48C establish communication at all times between the valve chamber 34B and the reservoir chamber 40. The length of the large-diameter portion of the stem portion 48B as measured along the axis 32 is set such that, even when the reservoir piston 38, together with the plunger 48, is displaced toward the end cap 42 until the reservoir piston 38 touches the end cap 42, the stem portion 48B does not come out from a bore of the housing 28 which defines the valve chamber 34B. Other configurational features of the second embodiment are similar to those of the above-described first embodiment.

Thus, according to the second embodiment, as in the case of the above-described first embodiment, there can be eliminated deterioration in feeling, which would otherwise be caused by delay in pressure rise in the wheel cylinder and delay in actual braking action when a braking operation is performed; braking response at the time of beginning of the braking operation can be reliably enhanced; the pressure-regulating action of the communication control valve 20 on the pressure in the reservoir chamber 40 can be activated early enough; and while the communication control valve 20 is maintained in a closed condition, the supply of high-pressure oil by the pump 66 can be reliably achieved from the beginning of driving of the pump 66.

Particularly, according to the second embodiment, the piston portion 48A of the plunger 48 is fitted into the cylinder bore 28A of the housing 28. Therefore, as compared with the above-described first embodiment, a pressure-receiving area of the plunger 48 which receives the suction pressure of the pump 66 can be increased. This can enhance response of the plunger 48 to the suction pressure of the pump 66.

Third Embodiment

Figure 3:
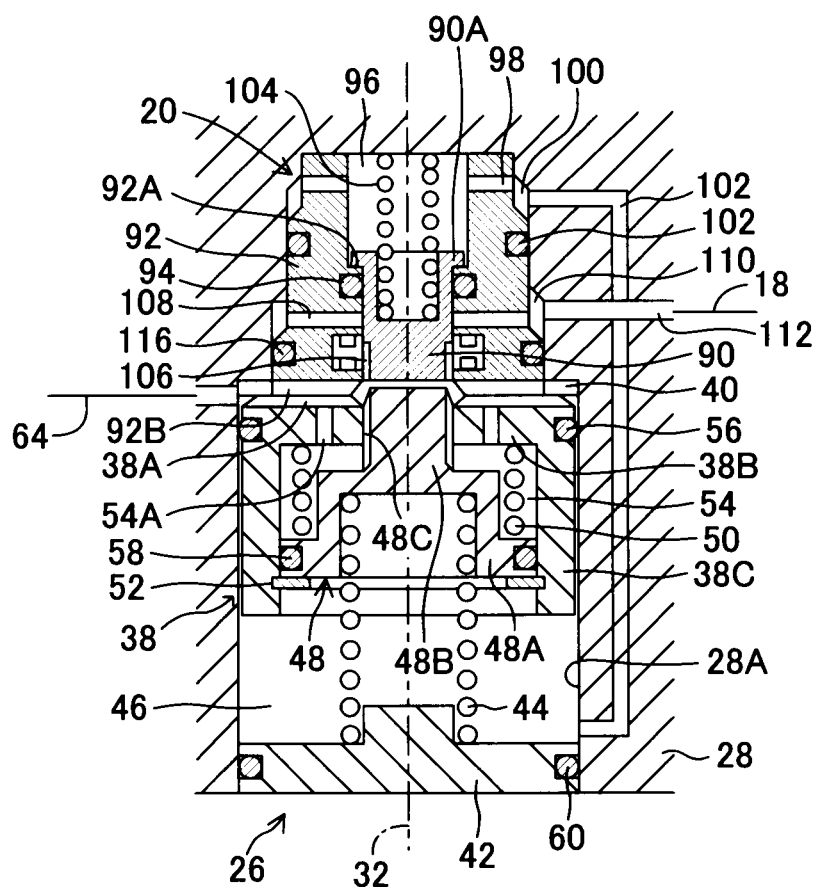
FIG. 3 is a sectional view showing a spool-valve-type communication control valve and a reservoir of a third embodiment of a vehicular braking apparatus according to the present invention.

FIG. 3 is a sectional view showing a spool-valve-type communication control valve and a reservoir of a third embodiment of a vehicular braking apparatus according to the present invention.

In the third embodiment, the communication control valve 20 is a spool valve which has a spool 90 as a valve element. A valve housing member 92 is disposed in a portion of the housing 28 which is adapted to accommodate the communication control valve 20, and is fixed to the housing 28 by, for example, press-fitting. The valve housing member 92 has a bore 94 which extends along the axis 32 and which supports the spool 90 such that the spool 90 can reciprocally move along the axis 32. The bore 94, in cooperation with the housing 28 and the spool 90, defines an air chamber 96 whose volume is variable. The air chamber 96 communicates at all times with the air chamber 46 via an internal passage 98 formed in the valve housing member 92, an annular passage 100 defined between the housing 28 and the valve housing member 92, and an internal passage 102 formed in the housing 28.

The spool 90 has a large-diameter portion 90A at an end portion located on a side opposite the reservoir piston 38. A compression coil spring 104 elastically disposed between the spool 90 and an end face of the bore 28A of the housing 28 urges the large-diameter portion 90A along the axis 32 toward the reservoir piston 38 and the plunger 48 such that the large-diameter portion 90A touches a shoulder portion 92A of the valve housing member 92. The spool 90 has a small-diameter portion at an end portion located on a side toward the reservoir piston 38 and the plunger 48. The small-diameter portion defines an annular passage 106 in cooperation with the housing member 92. The annular passage 106 communicates with the reservoir chamber 40.

The valve housing member 92 has a plurality of radial passages 108 whose inner ends open to the interior of the valve housing member 92. Outer ends of the radial passages 108 are connected to the master pipe 18 via an annular passage 110 defined between the housing 28 and the valve housing member 92 and a passage 112 formed in the housing 28. When the large-diameter portion 90A of the spool 90 touches the shoulder portion 92A of the valve housing member 92, the spool 90 shuts off communication of the radial passages 108 with the annular passage 106. When the spool 90 is displaced against the spring force of the compression coil spring 104 by a predetermined distance in the direction of retreat from the reservoir piston 38 and the plunger 48, the radial passages 108 communicate with the annular passage 106.

A plurality of land portions 92B are formed on an end face of the valve housing member 92 located on a side toward the reservoir piston 38. By virtue of the land portions 92B, even when the urging force of the compression coil spring 44 causes the reservoir piston 38 to touch the valve housing member 92, the reservoir chamber 40 is defined therebetween. The stem portion 48B of the plunger 48 has small-diameter portions, and the small-diameter portions define axial passages 48C. The axial passages 48C communicate with the reservoir chamber 40, and the reservoir chamber 40 communicates with the pressure chamber 54 through the communication holes 54A formed in the reservoir piston 38.

The length of the stem portion 48B of the plunger 48 is set such that, in a state in which the land portions 38A of the reservoir piston 38 touch the land portions 92B of the valve housing member 92 and also in which the piston portion 48A of the plunger 48 touches the C ring 52, the end face of the stem portion 48B is slightly spaced from or touches, without pressing, the lower end in the drawing of the spool 90; i.e., an end portion of the spool 90 located on a side toward the plunger 48.

As shown in FIG. 3, the effective diameter of the spool 90 (diameter of a portion between the large-diameter portion 90A and the small-diameter portion) is set smaller than the effective diameter of the piston portion 48A of the plunger 48. Also, the compression coil spring 44 urges the plunger 48 toward the communication control valve 20, thereby urging the reservoir piston 38 toward the communication control valve 20 in cooperation with the plunger 48 and the compression coil spring 50.

The spring force of the compression coil spring 104 is set to a value smaller than the product of the effective pressure-receiving area of the piston portion 48A of the plunger 48 and the maximum suction pressure of the pump 66. In FIG. 3, reference numerals 114 and 116 denote respective seal rings for preventing leakage of oil from between associated members. Other configurational features of the third embodiment are similar to those of the above-described first embodiment.

Thus, according to the third embodiment, actions and effects similar to those of the above-described first and second embodiments can be yielded. Also, since the pressure in the master cylinder chamber 12 does not act on the spool 90, which is a valve element of the communication control valve 20, in the direction of opening and closing of the communication control valve 20, as compared with the above-described first and second embodiments, the spring forces of the compression coil springs 44 and 50 and the effective diameter of the piston portion 48A and the like can be readily set to respectively required values.

Also, according to the third embodiment, as compared with the above-described first and second embodiments, a unit consisting of the communication control valve 20 and the reservoir 26 can have a shorter axial direction, thereby improving mountability of these members into a vehicle.

Fourth Embodiment

Figure 4:
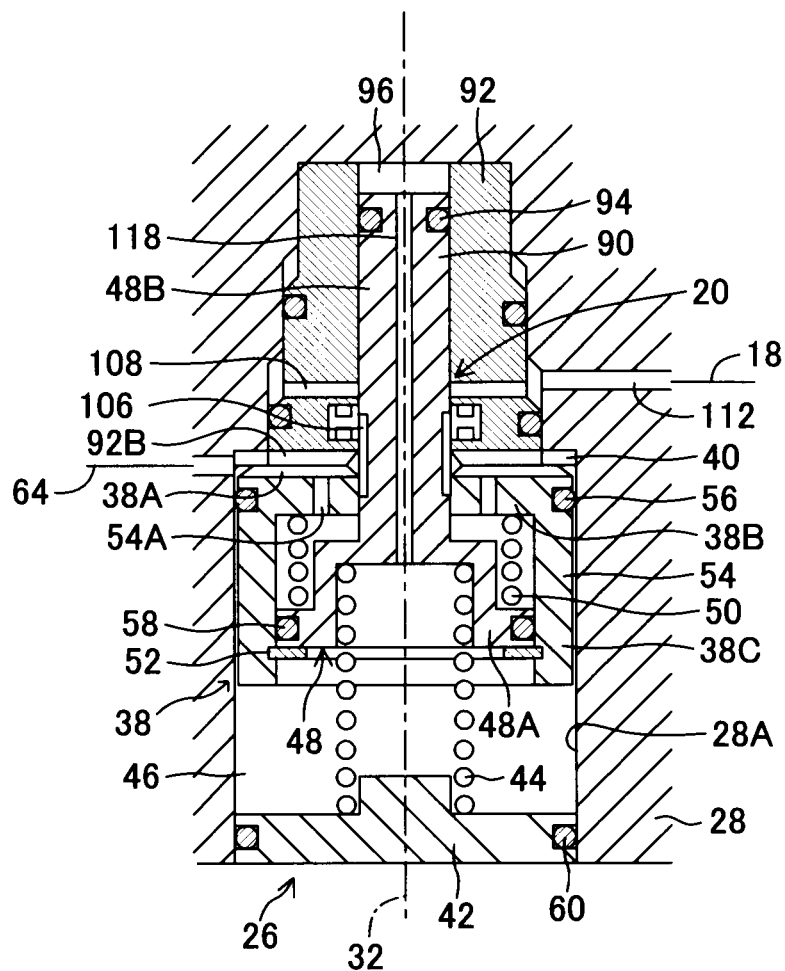
FIG. 4 is a sectional view showing a spool-valve-type communication control valve and a reservoir of a fourth embodiment of a vehicular braking apparatus according to the present invention.

FIG. 4 is a sectional view showing a spool-valve-type communication control valve and a reservoir of a fourth embodiment of a vehicular braking apparatus according to the present invention.

Also, in the fourth embodiment, the communication control valve 20 is a spool valve which has the spool 90 as a valve element; however, a compression coil spring corresponding to the compression coil spring 104 in the above-described third embodiment is not provided. Also, the spool 90 is integral with the stem portion 48B of the plunger 48, and the air chamber 96 communicates at all times with the air chamber 46 through an internal chamber 118 which is formed in the spool 90 and in the stem portion 48B of the plunger 48 in such a manner as to extend along the axis 32. Other configurational features of the fourth embodiment are similar to those of the above-described third embodiment.

Thus, according to the fourth embodiment, actions and effects similar to those of the above-described third embodiment can be yielded, except that the unit consisting of the communication control valve 20 and the reservoir 26 has a slightly longer axial length.

Particularly, according to the fourth embodiment, a compression coil spring corresponding to the compression coil spring 104 in the above-described third embodiment is not provided, and the spool 90 is integral with the stem portion 48B of the plunger 48. Therefore, as compared with the above-described third embodiment, the number of components can be decreased, and the communication control valve 20 and the reservoir 26 can be readily assembled.

According to the above-described third and fourth embodiments, the air chamber 96 communicates with the air chamber 46 at all times. Thus, as compared with the case where the two air chambers do not communicate with each other, the communication control valve 20 can be opened and closed smoothly and stably. Particularly, according to the fourth embodiment, the air chambers 46 and 96 communicate with each other through the internal passage 118 formed in the stem portion 48B of the plunger 48. Thus, as compared with the case where a passage for establishing communication between the two chambers 46 and 96 is formed in, for example, the housing 28 as in the case of the above-described third embodiment, the communication control valve 20 and the reservoir 26 can be simplified in structure. Notably, the air chambers 46 and 96 may be opened to the atmosphere without being mutually connected for communication through the internal passage 118 and the like.

Fifth Embodiment

Figure 5:
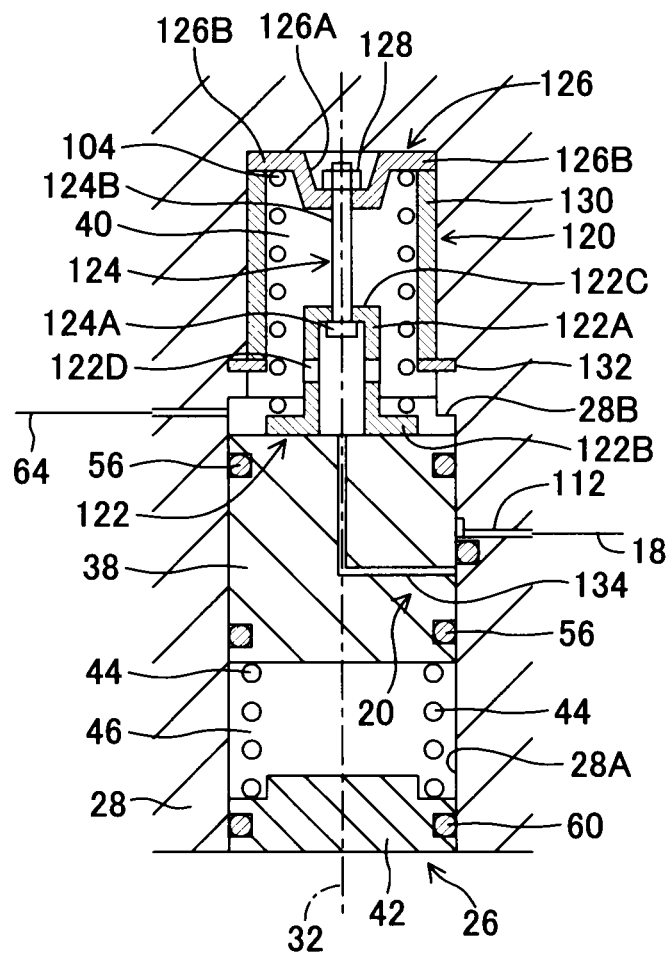
FIG. 5 is a sectional view showing a spool-valve-type communication control valve and a reservoir, which are integral with each other, of a fifth embodiment of a vehicular braking apparatus according to the present invention.

FIG. 5 is a sectional view showing a spool-valve-type communication control valve and a reservoir, which are integral with each other, of a fifth embodiment of a vehicular braking apparatus according to the present invention.

In the fifth embodiment, only the reservoir piston 38 is fitted into the cylinder bore 28A of the housing 28 in such a manner as to be reciprocally movable along the axis 32, and the reservoir piston 38 also functions as the plunger 48 and as the spool 90 in the above-described third and fourth embodiments. The reservoir piston 38, in cooperation with the housing 28, defines the reservoir chamber 40 whose volume is variable, on a side opposite the air chamber 46. The compression coil spring 104 is disposed within the reservoir chamber 40 and urges the reservoir piston 38 toward the end cap 42 against the spring force of the compression coil spring 44.

An urge-limiting device 120 is disposed within the reservoir chamber 40 and limits an action of the compression coil spring 104 urging the reservoir piston 38. The illustrated urge-limiting device 120 in the fifth embodiment includes a cup-shaped member 122, a slide member 124, and a base member 126. The cup-shaped member 122 has a cylindrical portion 122A, a rim portion 122B provided at one end of the cylindrical portion, and an end wall portion 122C provided at the other end of the cylindrical portion, and touches, at the rim portion 122B, an end face of the reservoir piston 38 located on a side toward the reservoir chamber 40. The cup-shaped member 122 has a plurality of holes 122D for establishing communication between the interior and the exterior thereof.

The slide member 124 is a bolt which has a head portion 124A and a shaft portion 124B. The head portion 124A touches the end wall portion 122C in the cup-shaped member 122. The shaft portion 124B extends to the exterior of the cup-shaped member 122 through the hole 122D formed in the end wall portion 122C of the cup-shaped member 122. An end portion of the shaft portion 124B extends through a raised portion 126A of the base member 126, which is disposed in contact with an end wall portion of the cylinder bore 28A, and is fixed to the base member 126 by means of a nut 128. While touching the end wall portion of the cylinder bore 28A, the base member 126 is fixed by means of a cylindrical collar 130, which is fitted into the cylinder bore 28A defining the reservoir chamber 40 and whose one end touches a peripheral portion of the base member 126, and a C ring 132 fixed to an inner wall surface of the cylinder bore 28A.

The compression coil spring 104 is elastically disposed between the rim portion 122B of the cup-shaped member 122 and the base portion 126B of the base member 126. The spring force of the compression coil spring 104 is greater than the spring force of the compression coil spring 44. Accordingly, at normal time, the head portion 124A butts against the end wall portion 122C of the cup-shaped member 122. This sets the position of the reservoir piston 38 in relation to the housing 28 to a predetermined standard position shown in FIG. 5. As the pressure in the reservoir chamber 40 drops, the reservoir piston 38 moves in a direction of reduction of the volume of the reservoir chamber 40. As a result, the shaft portion 124B advances into the cup-shaped member 122.

An internal passage 134 is formed in the reservoir piston 38 such that its one end opens to the reservoir chamber 40, while its other end opens at the outer cylindrical surface of the reservoir piston 38. When the reservoir piston 38 is positioned at the predetermined position shown in FIG. 5, an opening portion of the internal passage 134 located on a side toward the outer cylindrical surface is biased toward the end cap 42 from an opening portion of the passage 112 formed in the housing 28 and connected to the master pipe 18. By contrast, when the reservoir piston 38 moves by a predetermined distance in the direction of reduction of the volume of the reservoir chamber 40 and an end portion of the reservoir piston 38 touches the shoulder portion 28B formed on the housing 28, the opening portion of the internal passage 134 aligns with the opening portion of the passage 112, whereby the internal passage 134 and the passage 112 communicate with each other.

As is understood from the above description, the reservoir piston 38 and the housing 28, in cooperation with the compression coil spring 104, etc., control communication between the internal passage 134 and the passage 112 by means of the pressure in the reservoir chamber 40, thereby constituting the normally-closed spool-valve-type communication control valve 20 which controls communication between the master pipe 18 and the reservoir chamber 40. Other configurational features of the fifth embodiment are similar to those of the above-described fourth embodiment.

Thus, according to the fifth embodiment, actions and effects similar to those of the above-described third and fourth embodiments can be yielded. Additionally, only the reservoir piston 38 is fitted into the cylinder bore 28 of the housing 28, and the reservoir piston 38 also functions as the plunger 48 and as the spool 90 in the above-described third and fourth embodiments. Therefore, as compared with the above-described third and fourth embodiments, a unit consisting of the communication control valve 20 and the reservoir 26 can be simplified in structure.

Particularly, according to the illustrated fifth embodiment, the urge-limiting device 120 is disposed within the reservoir chamber 40 and limits an action of the compression coil spring 104 urging the reservoir piston 38. Thus, as compared with the case where the urge-limiting device is not provided, the reservoir piston 38 can be reliably positioned at the standard position, and opening and closing of the communication control valve 20 through movement of the reservoir piston 38 can be carried out stably.

Sixth Embodiment

Figure 6:
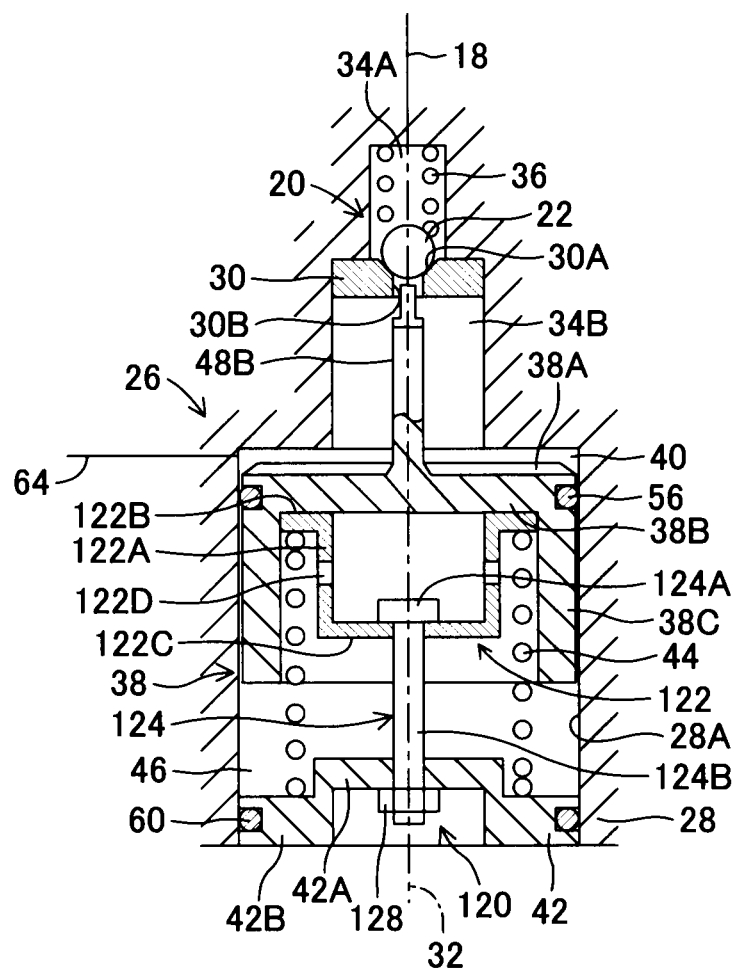
FIG. 6 is a sectional view showing a ball-check-valve-type communication control valve and a reservoir of a sixth embodiment of a vehicular braking apparatus according to the present invention.

FIG. 6 is a sectional view showing a ball-check-valve-type communication control valve and a reservoir of a sixth embodiment of a vehicular braking apparatus according to the present invention.

In the sixth embodiment, the reservoir piston 38 has the stem portion 48B formed integrally with the disk portion 38B and extending toward the communication control valve 20 along the axis 32. By virtue of this, the reservoir piston 38 also functions as the plunger 48 in the above-described first and second embodiments.

The urge-limiting device 120 is disposed between the reservoir piston 38 and the end cap 42 and limits an action of the compression coil spring 44 urging the reservoir piston 38. The urge-limiting device 120 has a structure similar to that of the urge-limiting device in the above-described embodiment. However, the rim portion 122B of the cup-shaped member 122 touches the inner surface of the disk portion 38B of the reservoir piston 38, and an end portion of the shaft portion 124B extends through a raised portion 42A of the end cap 42 and is fixed to the end cap 42 by means of the nut 128. The compression coil spring 44 is elastically disposed between the rim portion 122B of the cup-shaped member 122 and a base portion 42B of the end cap 42.

The length of the stem portion 48B and the distance between the rim portion 122B of the cup-shaped member 122 and the base portion 42B of the end cap 42 are set such that, at the time of nonbraking; i.e., in a state in which the rim portion 122B touches the inner surface of the disk portion 38B of the reservoir piston 38 and also in which the head portion 124A of the slide member 124 touches the end wall portion 122C of the cup-shaped member 122, an end portion of the stem portion 48B is loosely fitted into the communication hole 30B of the valve seat member 30 and also such that the end face of the stem portion 48B is slightly spaced from or touches, without pressing, the ball 22 of the communication control valve 20.

Accordingly, when, in a standard state shown in FIG. 6, the pressure in the reservoir chamber 40 drops, the reservoir piston 38 is displaced in relation to the housing 28 toward the communication control valve 20 along the axis 32; the disk portion 38B moves away from the rim portion 122B of the cup-shaped member 122; and the end of the stem portion 48B moves the ball 22 away from the valve seat 30A against the spring force of the compression coil spring 36. Thus, the stem portion 48B functions as the valve-opening means for opening the communication control valve 20, which valve-opening means is driven by means of a drop in the pressure in the reservoir chamber 40. Other configurational features of the sixth embodiment are similar to those of the above-described first and second embodiments.

Thus, according to the sixth embodiment, actions and effects similar to those of the above-described first and second embodiments can be yielded. Also, since the reservoir piston 38 integrally has the stem portion 48B and thus functions as the plunger 48 in the above-described first and second embodiments, as compared with the first and second embodiments, a unit consisting of the communication control valve 20 and the reservoir 26 can be simplified in structure.

Particularly, according to the illustrated sixth embodiment, the urge-limiting device 120 is disposed between the reservoir piston 38 and the end cap 42 and limits an action of the compression coil spring 44 urging the reservoir piston 38. Thus, as in the case of the above-described fifth embodiment, as compared with the case where the urge-limiting device is not provided, the reservoir piston 38 can be reliably positioned at the standard position, and opening and closing of the communication control valve 20 through movement of the reservoir piston 38 can be carried out stably.

Seventh Embodiment

Figure 7:
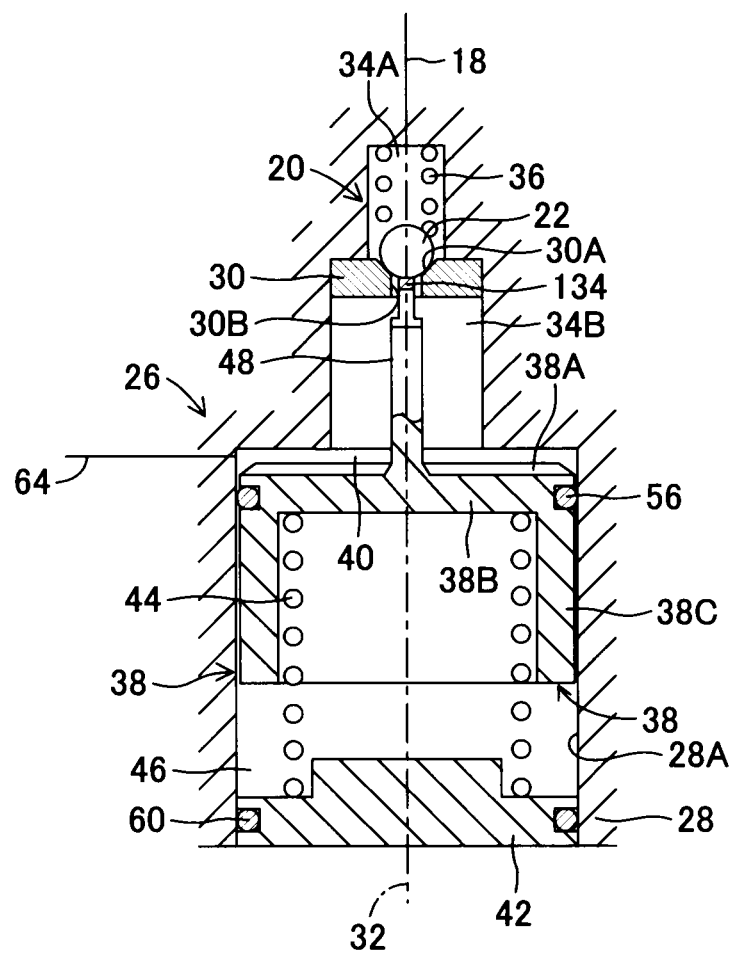
FIG. 7 is a sectional view showing a ball-check-valve-type communication control valve and a reservoir of a seventh embodiment of a vehicular braking apparatus according to the present invention.

FIG. 7 is a sectional view showing a ball-check-valve-type communication control valve and a reservoir of a seventh embodiment of a vehicular braking apparatus according to the present invention.

Also, in the seventh embodiment, as in the case of the above-described sixth embodiment, the reservoir piston 38 has the stem portion 48B formed integrally with the disk portion 38B and extending toward the communication control valve 20 along the axis 32. By virtue of this, the reservoir piston 38 also functions as the plunger 48 in the above-described first and second embodiments. However, an urge-limiting device corresponding to the urge-limiting device 120 in the above-described sixth embodiment is not provided. As in the case of the above-described first and second embodiments, the compression coil spring 44 is elastically disposed between the end cap 42 and the disk portion 38B of the reservoir piston 38.

An elastic material 134 like rubber is attached to an end of the stem portion 48B, and the end of the stem portion 48B touches the valve element of the check valve via the elastic material 134. The length of the stem portion 48B and the elastic material 134 is set such that, in a state in which the disk portion 38B of the reservoir piston 38 is spaced from the end face of the cylinder bore 28A toward the end cap 42, the elastic material 134 touches the ball 22 of the communication control valve 20. Spring forces of the compression coil springs 36 and 44 and the elastic material 134 are set such that, in the standard state shown in FIG. 7, in which the communication control valve 20 is in a closed condition and also in which the end of the stem portion 48B touches the ball 22, an urging force which the compression coil spring 36 applies to the ball 22 is greater than the sum of an urging force which the compression coil spring 44 applies to the reservoir piston 38 and an urging force of the elastic material 134. Other configurational features of the seventh embodiment are similar to those of the above-described first, second, and sixth embodiments.

Thus, according to the seventh embodiment, actions and effects similar to those of the above-described first, second, and sixth embodiments can be yielded. Also, as compared with these embodiments, the number of components can be drastically reduced, and a unit consisting of the communication control valve 20 and the reservoir 26 can be simplified in structure to a far greater extent. Also, since the elastic material 134 allows idle movement of the reservoir piston 38, as in the case of the above-described embodiments, even when the driving of the pump 66 is started, the communication control valve 20 is maintained in a closed condition until the pressure in the reservoir chamber 40 assumes a predetermined value. By virtue of this, at the time of ABS control, while inflow of a portion of oil contained in the master cylinder chamber 12 into the reservoir chamber 40 via the communication control valve 20 is prevented, high-pressure oil can be reliably supplied by the pump 66.

Particularly, according to the seventh embodiment, the end of the stem portion 48B touches the ball 22 of the communication control valve 20 via the elastic material 134. Thus, as compared with the case where, in the standard state of the communication control valve 20 and the reservoir 26, the end of the stem portion 48B is spaced from the valve element like the ball 22, there can be reliably lowered the likelihood of occurrence of hammering sound, which is caused by the end of the stem portion 48B hitting the valve element at the beginning of driving of the pump.

Eighth Embodiment

Figure 10:
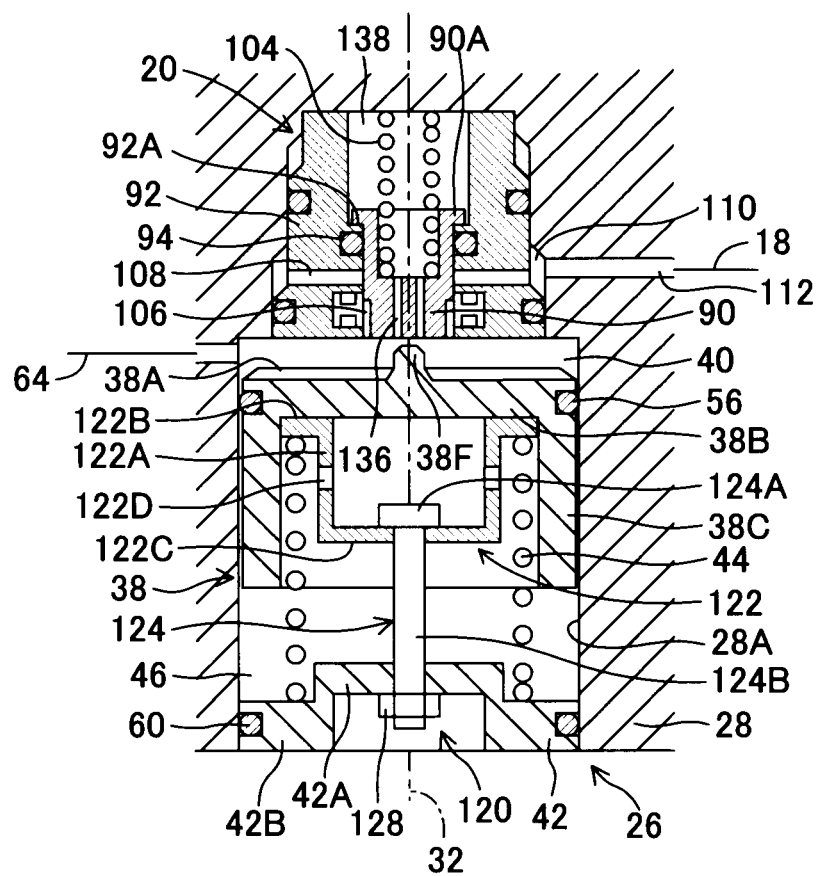
FIG. 10 is a sectional view showing a spool-type communication control valve and a reservoir of an eighth embodiment of a vehicular braking apparatus according to the present invention, the eighth embodiment being a modification of the sixth embodiment.

FIG. 10 is a sectional view showing a spool-type communication control valve and a reservoir of an eighth embodiment of a vehicular braking apparatus according to the present invention, the eighth embodiment being a modification of the sixth embodiment.

Also, in the eighth embodiment, as in the case of the above-described sixth embodiment, the urge-limiting device 120 is provided. However, the communication control valve 20 is not a ball check valve, but is a spool valve which has the spool 90 as a valve element as in the case of the above-described third embodiment. The reservoir piston 38 has a protrusion 38F which is formed integrally with the disk portion 38B and extends toward the communication control valve 20 along the axis 32 as in the case of the stem portion 48B in the above-described sixth embodiment. At the time of nonbraking, the protrusion 38F is slightly spaced from or touches, without pressing, a lower end face of the spool 90.

When the pressure in the reservoir chamber 40 drops because of the suction pressure of the oil pump 66, and thus the reservoir piston 38 moves in a direction of reduction of the volume of the reservoir chamber 40, the protrusion 38F drives the spool 90 upward as viewed in FIG. 10, thereby opening the communication control valve 20. Accordingly, the reservoir piston 38 also functions as the plunger 48 for opening and closing the communication control valve 20 in the above-described first to third embodiments; i.e., as a reciprocally movable member of valve-opening means.

As will be understood from comparison between FIGS. 10 and 3, in the eighth embodiment, the housing 28 and the valve housing member 92 do not have passages corresponding to the passages 98 and 102 and the like for establishing communication between the air chambers 46 and 96 in the above-described third embodiment. Instead, the spool 90 has a plurality of internal passages 136 extending along the axis 32, like the internal passage 118 in the above-described fourth embodiment. The spool 90, in cooperation with the housing 28 and the valve housing member 92, defines a variable-volume chamber 138 on a side opposite the reservoir chamber 40. The variable-volume chamber 138 communicates at all times with the reservoir chamber 40 through the internal passages 136 and is thus filled with oil having the same pressure as that of oil contained in the reservoir chamber 40. Other configurational features of the eighth embodiment are similar to those of the above-described third or sixth embodiment.

Thus, according to the eighth embodiment, actions and effects similar to those of the above-described third and sixth embodiments can be yielded. Also, as compared with the third embodiment, the communication control valve 20 and the reservoir 26 are simplified in structure, thereby reducing cost and the number of components and facilitating the assembly of the communication control valve 20 and the assembly of the reservoir 26.

Particularly, according to the eighth embodiment, the variable-volume chamber 138 communicates at all times with the reservoir chamber 40 through the internal passages 136. Accordingly, the same oil pressure acts on both sides of the spool 90 along the direction of the axis 32, thereby reliably avoiding imposition of an excess force on the spool 90 along the direction of opening and closing of the communication control valve 20, which would otherwise result from a difference in pressure acting on the opposite sides of the spool 90, as well as avoiding an associated adverse effect on an opening/closing movement of the spool 90.

In the case of the above-described third embodiment, the air chamber 96 communicates with the air chamber 46 through the passages 98 and 102, etc., and the pressure in the air chamber 96 is the atmospheric pressure. Thus, the atmospheric pressure acts on the upper end of the spool 90 as viewed in FIG. 3. When the effective diameters of the plunger 48 and the spool 90 are represented by 2Rp and 2Rs, respectively, the pressure in the reservoir chamber 40 (pressure chamber 54) is represented by Pr (negative pressure), and the atmospheric pressure is represented by Pair, a drive force F of the plunger 48 to drive the spool 90 in a direction of opening of the communication control valve 20 by means of the oil pump 66 causing a reduction in the pressure in the reservoir chamber 40 is represented by the following Expression 1. Of the cross-sectional area of the plunger 48 obtained by use of the effective diameter 2Rp, a portion which is equivalent to the cross-sectional area of the spool 90 corresponding to the effective diameter 2Rs does not contribute to generation of the drive force F.

$$F=(\text{Pair}-Pr)\cdot\pi(Rp^2-Rs^2) \tag{1}$$

By contrast, according to the eighth embodiment, the pressure in the variable-volume chamber 138 is not the atmospheric pressure, but is maintained at all times at the same pressure as that in the reservoir chamber 40 by the internal passages 136. Thus, when the effective diameter of the reservoir piston 38 is represented by 2Rr, a drive force F of the reservoir piston 38 to drive the spool 90 in a valve-opening direction via the protrusion 38F is represented by the following Expression 2. The entire cross-sectional area of the reservoir piston 38 corresponding to the effective diameter 2Rr contributes to generation of the drive force F.

$$F=(\text{Pair}-Pr)\cdot\pi Rr^2 \tag{2}$$

Accordingly, as compared with the case where the atmospheric pressure acts on an end portion of the spool 90 located on a side opposite the reservoir chamber 40, the driver force F of the reservoir piston 38 to drive the spool 90 in the valve-opening direction can be greater. This reliably enables driving of the spool 90 by means of the oil pump 66 causing a reduction in the pressure in the reservoir chamber 40. Also, the size of the reservoir 26 can be reduced by reducing the effective diameter 2Rr of the reservoir piston 38 required to generate a necessary force to drive the spool 90.

Also, according to the illustrated eighth embodiment, two chambers located on the opposite sides of the spool 90 along the direction of the axis 32; i.e., the reservoir chamber 40 and the variable-volume chamber 138, communicate at all times with each other through the internal passages 136 provided in the spool 90. Thus, as compared with the case of the above-described third embodiment in which the two chambers communicate at all times with each other through the internal passages formed in the housing 28, etc., the structure can be simplified, and thus the machining cost for the housing 28, etc. can be lowered.

Ninth Embodiment

Figure 11:
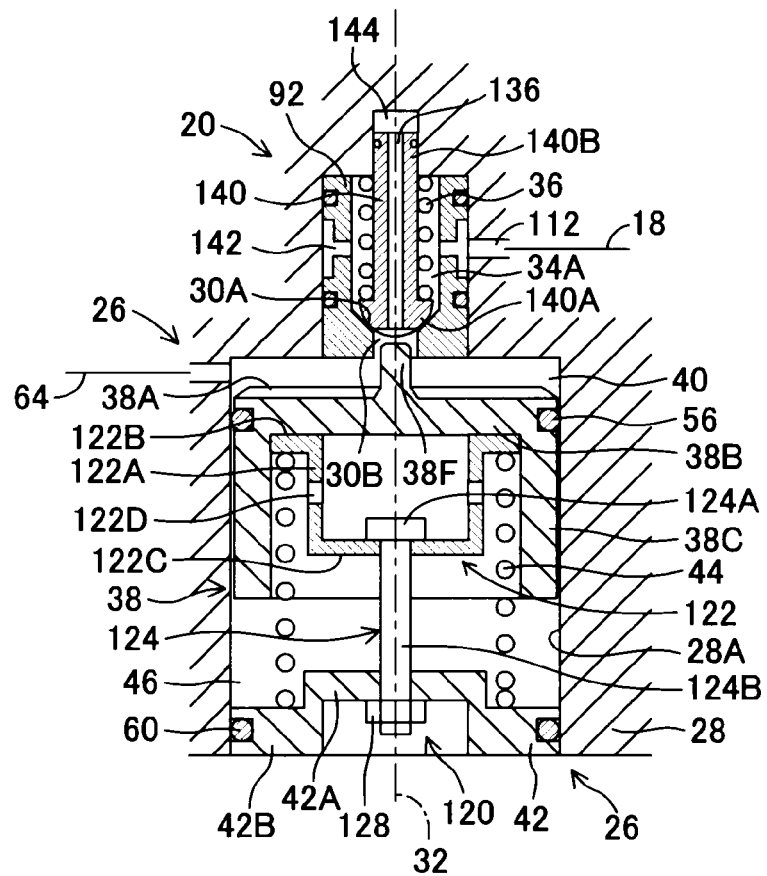
FIG. 11 is a sectional view showing a poppet-check-valve-type communication control valve and a reservoir of a ninth embodiment of a vehicular braking apparatus according to the present invention, the ninth embodiment being a modification of the sixth and eighth embodiments.
Figure 12:
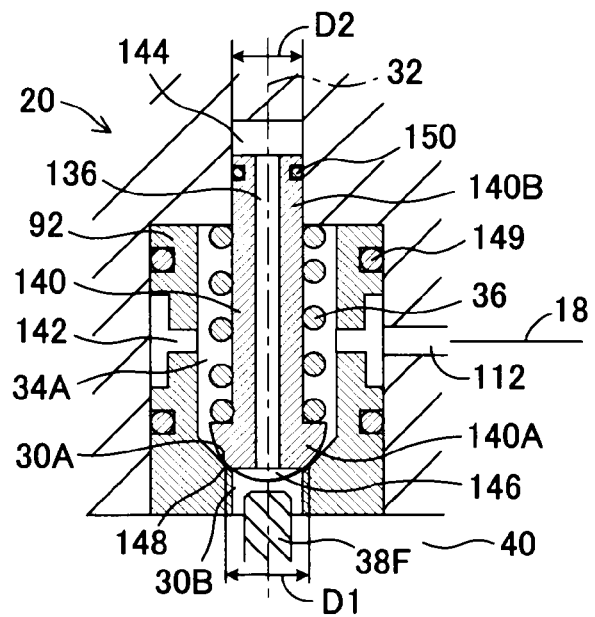
FIG. 12 is an enlarged sectional view of the communication control valve shown in FIG. 11.
Figure 13:
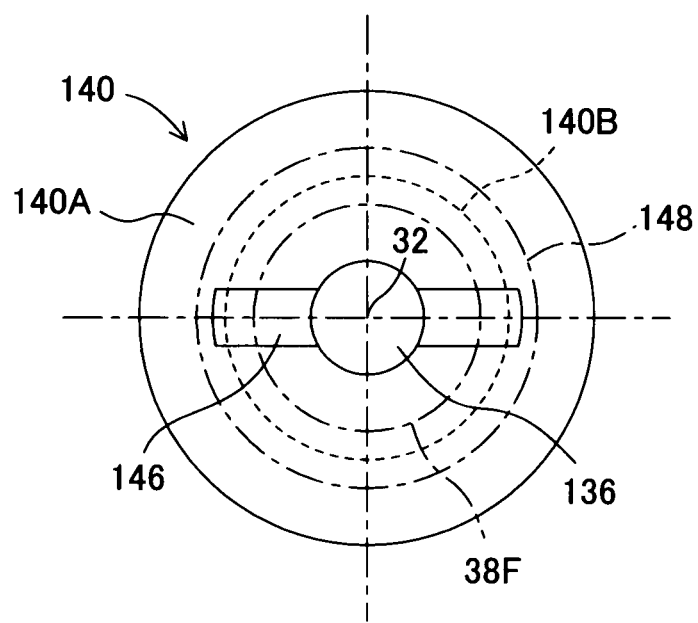
FIG. 13 is a bottom view showing, on a further enlarged scale, an end face, on a side toward a reservoir chamber, of a head portion of a valve element shown in FIGS. 11 and 12.

FIG. 11 is a sectional view showing a poppet-check-valve-type communication control valve and a reservoir of a ninth embodiment of a vehicular braking apparatus according to the present invention, the ninth embodiment being a modification of the sixth and eighth embodiments. FIG. 12 is an enlarged sectional view of the communication control valve shown in FIG. 11. FIG. 13 is a bottom view showing, on a further enlarged scale, an end face, on a side toward a reservoir chamber, of a head portion of a valve element shown in FIGS. 11 and 12.

Also, in the ninth embodiment, as in the case of the above-described sixth and eighth embodiments, the urge-limiting device 120 is provided. However, the communication control valve 20 is not a ball check valve or a spool valve, but is a poppet check valve which has a poppet valve element 140. As in the case of the above-described eighth embodiment, the reservoir piston 38 has the protrusion 38F, which is formed integrally with the disk portion 38B and extends toward the communication control valve 20 along the axis 32. The reservoir piston 38 also functions as the plunger 48 for opening and closing the communication control valve 20 in the above-described first to third embodiments.

The valve element 140 has a head portion 140A of a large diameter and a spool portion 140B of a small diameter, which are integral with each other, and is disposed within the housing 28 such that the head portion 140A is located on a side toward the reservoir chamber 40 with respect to the spool portion 140B. The valve element 140 extends along the axis 32 in such a manner as to be loosely fitted into the valve housing member 92, which is fixed to the housing 28 by, for example, press-fitting. The valve housing member 92 defines the valve chamber 34A in cooperation with the housing 28. The valve housing member 92 of the present embodiment assumes a substantially cylindrical shape whose lower end portion has a small inside diameter, and has a conical valve seat 30A aligned with the axis 32 of the communication control valve 20, and the communication hole 30B, which establishes communication between the valve chamber 34A and the reservoir chamber 40.

The compression coil spring 36 elastically disposed between the head portion 140A and the housing 28 urges the valve element 140 against the valve seat 30A. Accordingly, at normal time, the communication control valve 20 is closed through the head portion 140A touching the valve seat 30A, thereby shutting off communication between the valve chamber 34A and the reservoir chamber 40. The valve chamber 34A communicates at all times with the other end of the master pipe 18 via the internal passage 112 formed in the housing 28 and an internal passage 142, which consists of a plurality of radial passages formed in a cylindrical portion of the valve housing member 92 and an annular groove formed in the outer circumference of the cylindrical portion and communicating with the plurality of radial passages.

The spool portion 140B of the valve element 140 is supported by the housing 28 in such a manner as to be reciprocally movable along the axis 32, and defines a variable-volume chamber 144 in cooperation with the housing 28. The variable-volume chamber 144 communicates at all times with the reservoir chamber 40 through a single internal passage 136 formed in the valve element 140 and extending longitudinally. The head portion 140A assumes a substantially hemispherical shape and has a groove 146, which communicates at all times with the internal passage 136 and extends perpendicularly to the internal passage 136 as shown in detail in FIGS. 12 and 13. Accordingly, even when the protrusion 38F touches the head portion 140A, by virtue of the internal passage 136 and the groove 146, the variable-volume chamber 144 and the reservoir chamber 40 are maintained in a communicating condition. Also, the opposite ends of the groove 146 are located radially inward of a circle located at a position 148 where the head portion 140A touches the valve seat 30A. This prevents communication between the internal passage 136 and the valve chamber 34A when the communication control valve 20 is in a closed condition.

When the diameter of the circle located at the position 148 is represented by D1, and the effective diameter of the spool portion 140B is represented by D2, the diameter D1 and the effective diameter D2 are set such that the diameter D1 is equal to or greater than the effective diameter D2 and such that the difference therebetween is 0 or a small positive value. In FIGS. 11 and 12, reference numerals 149 and 150 denote respective seal rings for preventing leakage of oil from between associated members. Furthermore, other configurational features of the ninth embodiment are similar to those of the above-described third, sixth, or eighth embodiment.

Thus, according to the ninth embodiment, actions and effects similar to those of the above-described third, sixth, and eighth embodiments can be yielded. Also, as in the case of the above-described first, second, sixth, and seventh embodiments in which the communication control valve 20 is a ball check valve, when the valve element 140 slightly moves in the valve-opening direction, the communication control valve 20 opens. Thus, as compared with the case of the third to fifth, and eighth embodiments in which the communication control valve 20 is a spool valve, there can be enhanced the valve-opening response of the communication control valve 20 to a pressure drop in the reservoir chamber 40 caused by the oil pump 66, and the communication control valve 20 can be simplified in structure.

Also, according to the ninth embodiment, the spool portion 140B of the valve element 140 is supported by the housing 28 in a reciprocally movable manner. Thus, as compared with the case of the above-described first, second, sixth, and seventh embodiments in which the on-off valve is a ball check valve, the valve element can be moved stably in the opening and closing direction, and thus the communication control valve 20 can be opened and closed stably by means of the suction pressure of the oil pump 66, which serves as pressurizing supply means.

Also, according to the ninth embodiment, the diameter D1 of the circle located at the position 148, where the head portion 140A touches the valve seat 30A, and the effective diameter D2 of the spool portion 140B are set such that the diameter D1 is equal to or greater than the effective diameter D2 and such that the difference therebetween is 0 or a small positive value. Thus, the pressure in the variable-movable chamber 144 applies neither a valve-opening, urging force nor an excessive valve-closing, urging force to the valve element 140. Therefore, the valve element 140 can be smoothly driven to a valve-opening position by means of the oil pump 66 causing a reduction in the pressure in the reservoir chamber 40.

While the present invention has been described in detail with reference to the above particular embodiments, it will be apparent to those skilled in the art that the present invention is not limited thereto, but may be embodied in various other forms without departing from the scope of the invention.

For example, in the above-described first, second, sixth, and seventh embodiments, the communication control valve 20 is a ball check valve. However, the check valve may be, for example, a poppet check valve as in the case of the ninth embodiment. Also, even in these embodiments, the communication control valve 20 may be, for example, a spool valve as in the case of the third embodiment.

In the above-described fifth, sixth, eighth, and ninth embodiments, the urge-limiting device 120 is composed of the cup-shaped member 122, the slide member 124, and the base member 126. However, the urge-limiting device 120 may assume any configuration known in the technical field, so long as urging by corresponding urging means can be limited. Also, the urge-limiting device 120 may be omitted.

In the above-described seventh embodiment, the end of the stem portion 48B touches the ball 22 of the communication control valve 20 via the elastic material 134. However, the end of the stem portion 48B may be in direct, rigid contact with the ball 22 of the communication control valve 20. In this case, the length of the stem portion 48B is set such that, in a state in which the disk portion 38B of the reservoir piston 38 is spaced from the end face of the cylinder bore 28A toward the end cap 42, the end of the stem portion 48B touches the ball 22 of the communication control valve 20. Also, spring forces of the compression coil springs 36 and 44 are set such that, in the standard state, in which the communication control valve 20 is in a closed condition and also in which the end of the stem portion 48B touches the ball 22, an urging force which the compression coil spring 36 applies to the ball 22 is greater than an urging force which the compression coil spring 44 applies to the reservoir piston 38.

By contrast, in the above-described first, second, and sixth embodiments, in the standard state, the end of the stem portion 48B is spaced from the ball 22 of the control communication valve 20, and, in the above-described third to fifth embodiments, in the standard state, for example, the annular passage 106 and the radial passages 108 are spaced from each other with respect to the axial direction. However, in the former group of embodiments, the end of the stem portion 48B may touch the valve element of the check valve directly or via an elastic material. In the latter group of embodiments, in the standard state, the annular passage 106 and the radial passages 108 may be adjacent to each other without communicating with each other.

Similarly, in the above-described eighth and ninth embodiments, at the time of nonbraking, the protrusion 38F is slightly spaced from or touches, without pressing, the lower end face of the spool 90 or the head portion 140A. However, an end of the protrusion 38F may touch the lower end face of the spool 90 or the head portion 140A via an elastic material like the elastic material 134.

Furthermore, in the above-described embodiments, the shut-off valve is composed of the one-way bypass pipe 86 and the linear solenoid valve 84, which, at normal time, only allows a flow of oil from the side of the oil supply pipe 68 to the side of the master pipe 18 and whose differential pressure ΔP is controlled through control of the control current Is. However, the shut-off valve may assume any configuration known in the technical field, so long as it can shut off communication between the master cylinder and the wheel cylinder in a state in which the pump 66 is driven, and also can allow a flow of oil from the side of the wheel cylinder to the side of the master cylinder as needed.

The invention claimed is:

1. A vehicular braking apparatus comprising:
    a shut-off valve that shuts off, as needed, a flow of a working liquid from a wheel cylinder to a master cylinder;
    a pressure increase-decrease control valve that increases and decreases a pressure in the wheel cylinder;
    a reservoir that receives and stores in a reservoir chamber the working liquid from the wheel cylinder when the pressure increase-decrease control valve is in a pressure decrease position and at a time when the working liquid in the master cylinder is pressurized;
    pressurizing supply means for sucking in and pressurizing the working liquid from the reservoir chamber and supplying the working liquid to the wheel cylinder via the pressure increase-decrease control valve when the pressure increase-decrease control valve is in a pressure increase position; and
    a communication control valve that controls communication between the master cylinder and the reservoir chamber,
    wherein the communication control valve includes a normally-closed on-off valve, and valve-opening means for opening the on-off valve by being driven by means of the suction pressure of the pressurizing supply means,
    wherein the normally-closed valve comprises a valve element and a valve element-urging member for urging the valve element to a closed position, and wherein the communication control valve maintains a closed condition at the time of nonbraking, and
    wherein the valve-opening means includes a reciprocally movable member disposed within the reservoir so as to be reciprocally movable in a direction of opening and closing of the on-off valve and that is driven in a direction of opening of the on-off valve by means of the suction pressure of the pressurizing supply means,
    the direction of opening of the on-off valve is a direction of reduction of a volume of the reservoir chamber,
    the reservoir has a housing, a reservoir piston disposed within the housing in a reciprocally movable manner and that defines the reservoir chamber in cooperation with the housing, and piston-urging means for urging the reservoir piston in the direction of reduction of the volume of the reservoir chamber, and the reservoir chamber communicates at all times with a suction side of the pressurizing supply means and communicates with the master cylinder via the communication control valve, and
    the reciprocally movable member includes a piston portion which is enclosed and supported by the reservoir piston so as to be telescopically displaceable in relation to the reservoir piston in a direction of reciprocal movement of the reservoir piston, and a stem portion united with the piston portion, the stem portion opens the on-off valve, and the piston portion and the stem portion, in cooperation with the reservoir piston, define a pressure chamber that communicates with the reservoir chamber at all times and functions as part of the reservoir chamber.

2. A vehicular braking apparatus according to claim 1, wherein, until the suction pressure of the pressurizing supply means attains a predetermined value or greater, the working liquid can flow from the reservoir to the pressurizing supply means in a state in which the communication control valve maintains a closed condition.

3. A vehicular braking apparatus according to claim 1, wherein, when an amount of movement of the reciprocally movable member in the direction of opening of the on-off valve from a position at the time of nonbraking is equal to or less than a preset amount of idle movement, the valve-opening means does not open the on-off valve.

4. A vehicular braking apparatus according to claim 1, wherein the stem portion extends through the reservoir piston in the direction of reciprocal movement of the reservoir piston.

5. A vehicular braking apparatus according to claim 1, wherein, when the suction pressure of the pressurizing supply means acts on the reservoir chamber in a state in which the on-off valve is closed and also in which the reservoir piston is positioned at such a position as to minimize a volume of the reservoir chamber, the reciprocally movable member is displaced in a direction of opening of the on-off valve, thereby reducing a working-liquid storage volume of the reservoir without movement of the reservoir piston.

6. A vehicular braking apparatus according to claim 1, wherein the on-off valve is a check valve including a valve element and valve-element-urging means for urging the valve element against a valve seat and that closes through the valve element touching the valve seat and opens through the valve element moving away from the valve seat.

7. A vehicular braking apparatus according to claim 1, wherein
    the reservoir includes a housing, a reservoir piston disposed within the housing in a reciprocally movable manner and that defines the reservoir chamber in cooperation with the housing, first piston-urging means for urging the reservoir piston in the direction of reduction of a volume of the reservoir chamber, and second piston-urging means for urging the reservoir piston in a direction of increase of the volume of the reservoir chamber;
    the reservoir piston includes an internal passage that communicates at all times with the reservoir chamber through one end of the internal passage;
    the reservoir piston functions as a spool of the communication control valve so as to be movable between a valve-closing position where communication of the internal passage with the master cylinder through the other end of the internal passage is shut off, and a valve-opening position where communication of the internal passage with the master cylinder through the other end of the internal passage is established as a result of the reservoir piston moving in the direction of reduction of the volume of the reservoir chamber from the valve-closing position; and
    the first and second piston-urging means set a position of the reservoir piston in relation to the housing such that, at the time of nonbraking, the communication control valve is closed.

8. A vehicular braking apparatus according to claim 7, wherein the reservoir further includes urge-limiting means for limiting a range in which the second piston-urging means urges the reservoir piston, in relation to a range of a reciprocal movement of the reservoir piston.

9. A vehicular braking apparatus according to claim 1, wherein
the on-off valve is a check valve including a valve element and valve-element-urging means for urging the valve element against a valve seat and that closes through the valve element touching the valve seat and opens through the valve element moving away from the valve seat;
the reservoir piston includes a portion that functions as the valve-opening means; and
the reservoir further includes urge-limiting means for limiting a range in which the piston-urging means urges the reservoir piston to a range within which the portion functioning as the valve-opening means does not open the on-off valve, in relation to a range of a reciprocal movement of the reservoir piston.

10. A vehicular braking apparatus according to claim 9, wherein, even when the suction pressure of the pressurizing supply means acts on the reservoir chamber in a state in which the on-off valve is closed and also in which the urge-limiting means limits an action of the piston-urging means urging the reservoir piston, the reservoir piston is displaced in a direction of opening of the on-off valve, thereby reducing the volume of the reservoir chamber.

11. A vehicular braking apparatus according to claim 1, wherein
the on-off valve is a check valve including a valve element and valve-element-urging means for urging the valve element against a valve seat and that closes through the valve element touching the valve seat and opens through the valve element moving away from the valve seat; the reservoir piston includes a portion that functions as the valve-opening means; and,
in a state in which the valve element touches the valve seat and also in which the portion touches the valve element, a force which the valve-element-urging means applies to the valve element for urging the valve element is greater than a force which the piston-urging means applies to the reservoir piston for urging the reservoir piston.

12. A reservoir provided in a vehicular braking apparatus comprising:
a shut-off valve that shuts off, as needed, a flow of a working liquid from a wheel cylinder to a master cylinder;
a pressure increase-decrease control valve that increases and decreases a pressure in the wheel cylinder;
pressurizing supply means for pressurizing the working liquid and supplying the working liquid to the wheel cylinder via the pressure increase-decrease control valve at a time when the pressure increase-decrease control valve is in a pressure increase position and the working liquid in the master cylinder is pressurized, the reservoir receiving and storing in a reservoir chamber the working liquid from the wheel cylinder when the pressure increase-decrease control valve is in a pressure decrease position, the reservoir chamber communicating with a suction side of the pressurizing supply means; and
a communication control valve that controls communication between the master cylinder and the reservoir chamber,
wherein the communication control valve includes a normally-closed on-off valve, and valve-opening means for opening the on-off valve by being driven by means of the suction pressure of the pressurizing supply means,
wherein the normally-closed valve comprises a valve element and a valve element-urging member for urging the valve element to a closed position, and wherein the communication control valve maintains a closed condition at the time of nonbraking,
the valve-opening means includes a reciprocally movable member disposed within the reservoir so as to be reciprocally movable in a direction of opening and closing of the on-off valve and that is driven in a direction of opening of the on-off valve by means of the suction pressure of the pressurizing supply means,
the direction of opening of the on-off valve is a direction of reduction of a volume of the reservoir chamber,
the reservoir has a housing, a reservoir piston disposed within the housing in a reciprocally movable manner and that defines the reservoir chamber in cooperation with the housing, and piston-urging means for urging the reservoir piston in the direction of reduction of the volume of the reservoir chamber, and the reservoir chamber communicates at all times with a suction side of the pressurizing supply means and communicates with the master cylinder via the communication control valve, and the reciprocally movable member includes a piston portion which is supported by the reservoir piston so as to be displaceable in relation to the reservoir piston in the reservoir piston in a direction of reciprocal movement of the reservoir piston, and a stem portion united with the piston portion, the stem portion opens the on-off valve, and the piston portion and the stem portion, in cooperation with the reservoir piston, define a pressure chamber that communicates with the reservoir chamber at all times and functions as part of the reservoir chamber.

* * * * *